US012308153B2

(12) United States Patent
Furukawa et al.

(10) Patent No.: US 12,308,153 B2
(45) Date of Patent: May 20, 2025

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naotoshi Furukawa, Mie (JP); Kohei Yoshikawa, Mie (JP); Seiji Shitama, Mie (JP); Takehito Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 739 days.

(21) Appl. No.: 17/611,797

(22) PCT Filed: May 15, 2020

(86) PCT No.: PCT/JP2020/019529
§ 371 (c)(1),
(2) Date: Nov. 16, 2021

(87) PCT Pub. No.: WO2020/241324
PCT Pub. Date: Dec. 3, 2020

(65) Prior Publication Data

US 2022/0223329 A1 Jul. 14, 2022

(30) Foreign Application Priority Data

May 24, 2019 (JP) ................................ 2019-098078
Oct. 21, 2019 (JP) ................................ 2019-192275

(51) Int. Cl.
*H01F 27/06* (2006.01)
*H01F 27/02* (2006.01)
(Continued)

(52) U.S. Cl.
CPC ........... *H01F 27/022* (2013.01); *H01F 27/06* (2013.01); *H01F 27/26* (2013.01); *H01F 37/00* (2013.01); *H01F 41/127* (2013.01)

(58) Field of Classification Search
CPC .................................................... H01F 27/022
(Continued)

(56) References Cited

U.S. PATENT DOCUMENTS

2006/0201799 A1* 9/2006 Carrasco-Aguirre ... H01F 27/02 204/279
2015/0365015 A1* 12/2015 Ito ........................ H01F 27/306 336/208

(Continued)

FOREIGN PATENT DOCUMENTS

JP 2012-227493 A 11/2012
JP 2013-131567 A 7/2013
JP 2017-028084 A 2/2017

OTHER PUBLICATIONS

English translation of JP2017199890 (Year: 2017).*
International Search Report issued on Aug. 4, 2020 for WO 2020/241324 A1 (4 pages).

*Primary Examiner* — Ronald Hinson
(74) *Attorney, Agent, or Firm* — Venjuris, P.C.

(57) ABSTRACT

A reactor is provided with a coil including a pair of winding portions arranged in parallel, a magnetic core to be arranged inside and outside the winding portions, a holding member for specifying mutual positions of the coil and the magnetic core, a case for accommodating an assembly including the coil, the magnetic core and the holding member, and a sealing resin portion to be filled into the case. The case
(Continued)

includes a bottom plate portion, the assembly being placed on the bottom plate portion, a side wall portion for surrounding the assembly, and an opening facing the bottom plate portion. The assembly is so accommodated into the case that an axial direction of each winding portion is along a depth direction of the case. The magnetic core includes an outer core portion to be arranged outside the winding portions and on the opening side.

7 Claims, 10 Drawing Sheets

(51) Int. Cl.
*H01F 27/26* (2006.01)
*H01F 37/00* (2006.01)
*H01F 41/12* (2006.01)

(58) Field of Classification Search
USPC .................................................... 336/65, 221
See application file for complete search history.

(56) References Cited

U.S. PATENT DOCUMENTS

2017/0330671 A1* 11/2017 Athavale ................. H01F 27/22
2017/0338032 A1* 11/2017 Yoshikawa ........... H01F 27/022
2018/0190421 A1 7/2018 Yoshikawa et al.
2019/0131052 A1 5/2019 Kusawake et al.

* cited by examiner

REACTOR

CROSS REFERENCE TO RELATED APPLICATIONS

This application is a national phase of PCT application No. PCT/JP2020/019529, filed on 15 May 2020, which claims priority from Japanese patent application Nos. 2019-098078 and 2019-192275 filed on 24 May 2019 and 21 Oct. 2019, respectively, all of which are incorporated herein by reference.

TECHNICAL FIELD

The present disclosure relates to a reactor.

BACKGROUND

Patent Document 1 and Patent Document 2 disclose a reactor including a coil, a magnetic core, a case for accommodating an assembly of the coil and the magnetic core and a sealing resin portion for covering the outer periphery of the assembly by being filled into the case. Patent Document 1 discloses a structure for pressing an outer core portion arranged outside a winding portion of the coil, out of the magnetic core, toward the bottom surface of the case by a strip-like stay. The stay is arranged on a surface of the outer core portion on an opening side of the case. Both end surfaces of the stay are screwed to the case.

PRIOR ART DOCUMENT

Patent Document

Patent Document 1: JP 2017-055096 A
Patent Document 2: JP 2013-131567 A

SUMMARY OF THE INVENTION

Problems to be Solved

A reactor of the present disclosure is provided with a coil including a pair of winding portions arranged in parallel, a magnetic core to be arranged inside and outside the winding portions, a holding member for specifying mutual positions of the coil and the magnetic core, a case for accommodating an assembly including the coil, the magnetic core and the holding member, and a sealing resin portion to be filled into the case, wherein the case includes a bottom plate portion, the assembly being placed on the bottom plate portion, a side wall portion for surrounding the assembly, and an opening facing the bottom plate portion, the assembly is so accommodated into the case that an axial direction of each winding portion is along a depth direction of the case, the magnetic core includes an outer core portion to be arranged outside the winding portions and on the opening side, the holding member includes an outer wall portion for covering at least a part of an outer peripheral surface of the outer core portion and at least one projection projecting from the outer wall portion toward an inner peripheral surface of the side wall portion, and the projection is embedded in the sealing resin portion.

DETAILED DESCRIPTION TO EXECUTE THE INVENTION

Technical Problem

Figure 1:
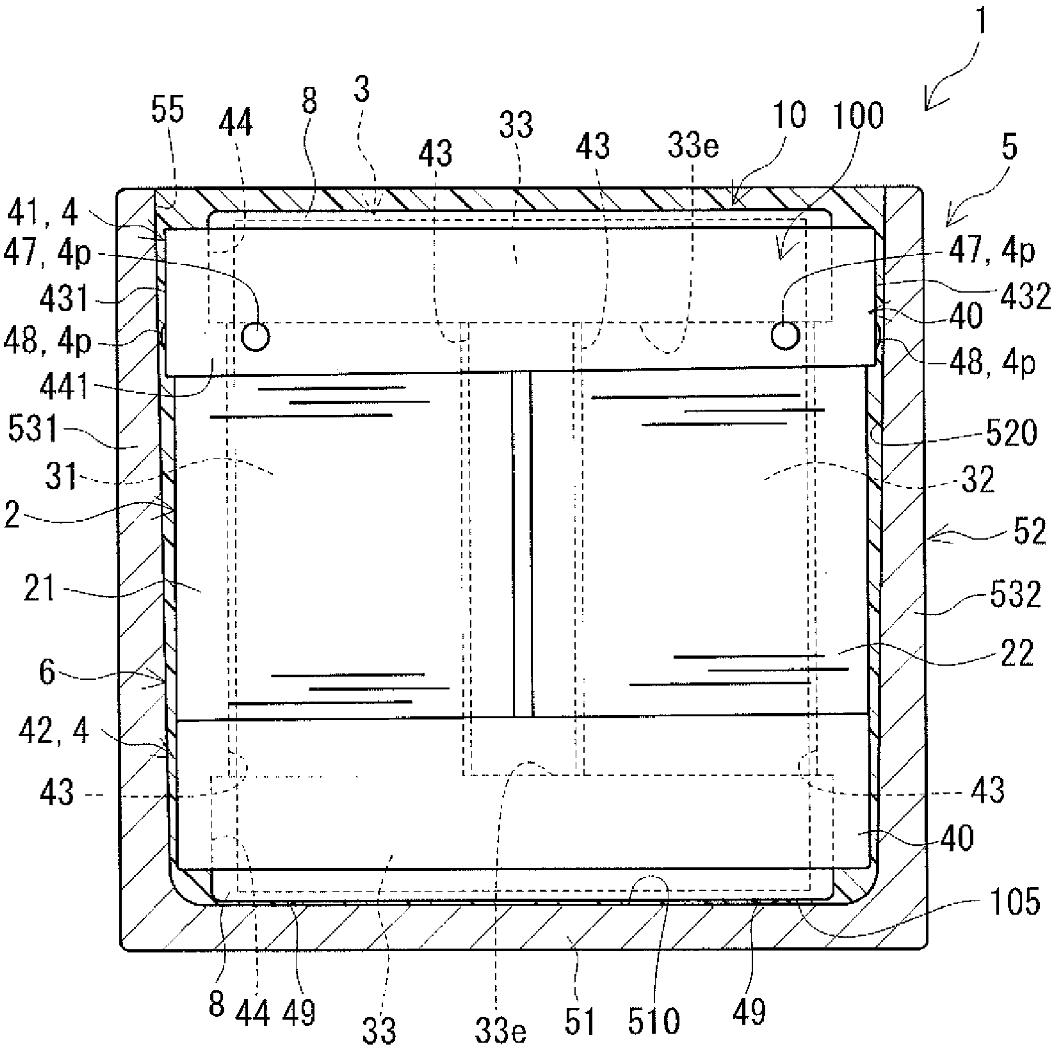
FIG. 1 is a schematic partial section obtained by cutting a reactor according to a first embodiment by a plane parallel to a depth direction and a length direction of a case.

It is desired to reduce an amplitude when an assembly including a coil and a magnetic core vibrates in a reactor provided with a case and a sealing resin portion.

Generally, when the coil is excited, the assembly vibrates. Further, if the reactor is an in-vehicle component or the like, the assembly vibrates also when receiving external vibration during use.

In the aforementioned pressing structure by the stay, it is expected that an amplitude can be reduced when the assembly vibrates along a depth direction of the case in the case. However, there is room for improvement in reducing an amplitude when the assembly vibrates in a direction intersecting the depth direction of the case, typically in a direction orthogonal to the depth direction, in the case.

Further, the case and the stay are integrated by the above screwing. Thus, vibration is easily transmitted between the assembly and the case. As a result, the assembly and the case easily vibrate as an integrated body. Particularly, if the case is thin, vibration is more easily transmitted to the assembly and the case.

If an amplitude when the assembly vibrates in the case is excessively large, an excessive stress or distortion is easily loaded to the sealing resin portion filled between the assembly and the case. As a result, the aggregate fracture and shear of the sealing resin portion possible occur.

One object of the present disclosure is to provide a reactor capable of reducing an amplitude when an assembly vibrates.

Effect of Present Disclosure

The reactor of the present disclosure can reduce an amplitude when an assembly vibrates.

DESCRIPTION OF EMBODIMENTS OF PRESENT DISCLOSURE

First, embodiments of the present disclosure are listed and described.

(1) A reactor according to an embodiment of the present disclosure is provided with a coil including a pair of winding portions arranged in parallel, a magnetic core to be arranged inside and outside the winding portions, a holding member for specifying mutual positions of the coil and the magnetic core, a case for accommodating an assembly including the coil, the magnetic core and the holding member, and a sealing resin portion to be filled into the case, wherein the case includes a bottom plate portion, the assembly being placed on the bottom plate portion, a side wall portion for surrounding the assembly, and an opening facing the bottom plate portion, the assembly is so accommodated into the case that an axial direction of each winding portion is along a depth direction of the case, the magnetic core includes an outer core portion to be arranged outside the winding portions and on the opening side, the holding member includes an outer wall portion for covering at least a part of an outer peripheral surface of the outer core portion and at least one projection projecting from the outer wall portion toward an inner peripheral surface of the side wall portion, and the projection is embedded in the sealing resin portion.

Since the reactor of the present disclosure includes the projection on the opening side of the case, an amplitude when the assembly vibrates in a direction intersecting the depth direction of the case can be reduced as compared to the case where the projection is not provided. There are the following two reasons for this. The direction intersecting the depth direction of the case may be called an intersecting direction below.

When the assembly vibrates in the intersecting direction in the case, an amplitude in a region of the assembly located on the opening side of the case tends to be larger than an amplitude in a region of the assembly located on the bottom plate portion side of the case. An interval between the outer peripheral surface of the assembly and the inner peripheral surface of the side wall portion of the case is locally narrowed on the opening side of the case by the projection. A displacement amount of the assembly in the intersecting direction in the case is limited due to the narrow interval.

By including the projection, a contact area becomes smaller when the outer peripheral surface of the assembly and the inner peripheral surface of the side wall portion of the case contact each other as compared to the case where no projection is provided. Thus, vibration is less likely to be transferred between the assembly and the case.

(2) As an example of the reactor of the present disclosure, the inner peripheral surface is inclined to widen from the bottom plate portion side toward the opening side.

In the above configuration, the interval between the outer peripheral surface of the assembly and the inner peripheral surface of the side wall portion of the case tends to be large on the opening side of the case. However, this interval is reliably narrowed by the projection. Further, the above configuration is also excellent in manufacturability in that the assembly is easily accommodated into the case in a manufacturing process of the reactor and the case is easily demolded in a manufacturing process of the case.

(3) As an example of the reactor of the present disclosure, if a first rectangle enclosing the assembly is virtually defined in a plan view from the depth direction, a dimension of the first rectangle along a long side direction is a long side length, a dimension of the first rectangle along a short side direction is a short side length and a dimension of the assembly along the depth direction is a height of the assembly, at least one of a ratio of the height to the long side length and a ratio of the height to the short side length exceeds 1.0.

It can be said that, with the shape of the assembly in the above configuration, an amplitude in the region of the assembly on the opening side of the case tends to be large when the assembly vibrates in the aforementioned intersecting direction. Also in such a configuration, the amplitude can be reduced by the projection.

(4) As an example of the reactor of the present disclosure, if a second rectangle enclosing the outer wall portion is virtually defined in a plan view from the depth direction, the outer wall portion has a first surface along a long side direction of the second rectangle and a second surface along a short side direction of the second rectangle, and the holding member includes a first projection provided on the first surface and a second projection provided on the second surface.

In the above configuration, an amplitude of the assembly can be reduced even if the assembly vibrates in an arbitrary intersecting direction in the case.

(5) As an example of the reactor of the present disclosure, at least one of the projections has a spherical segment shape.

In the above configuration, the projection is in point contact with the inner peripheral surface of the side wall portion of the case. Thus, a contact area of the projection and the inner peripheral surface is small. From this aspect, vibration is less likely to be transmitted between the assembly and the case.

(6) As an example of the reactor of the present disclosure, the holding member includes a plurality of the projections, and at least one of the projections is not in contact with the inner peripheral surface.

In the above configuration, the projection and the case are less likely to contact each other, preferably do not contact each other at all, at the time of vibration. Thus, vibration is less likely to be transmitted, preferably not transmitted at all, between the assembly and the case.

(7) As an example of the reactor of the present disclosure, the assembly has an end surface facing the bottom plate portion and a leg portion, and the leg portion projects from the end surface toward the bottom plate portion.

In the above configuration, a contact area of the end surface of the assembly and an inner bottom surface of the bottom plate portion of the case is small as compared to the case where no leg portion is provided. Thus, vibration is less likely to be transmitted between the assembly and the case.

DETAILS OF EMBODIMENTS OF PRESENT DISCLOSURE

Specific examples of reactors according to embodiments of the present disclosure are described below with reference to the drawings. The same reference signs in the drawings denote the same components. Components may be shown in a partially exaggerated or simplified manner in the drawings for the convenience of description. A dimension ratio of each part in the drawings may be different from an actual one.

First Embodiment

A reactor 1 of a first embodiment is described with reference to FIGS. 1 to 4.

Figure 3:
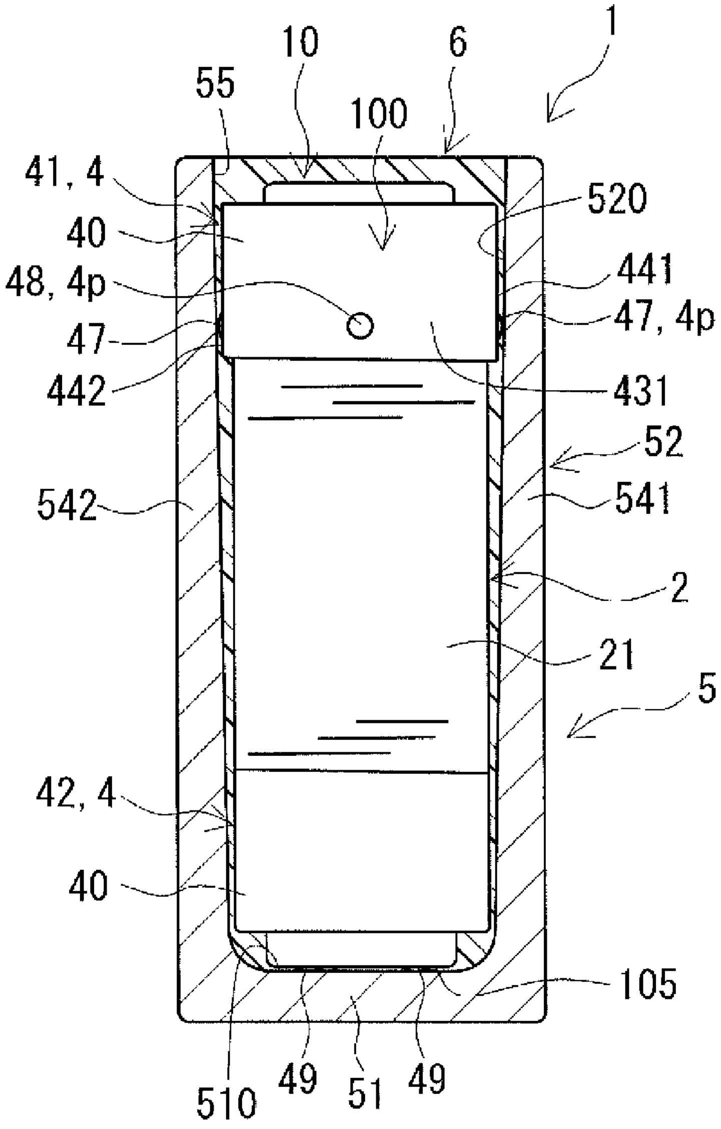
FIG. 3 is a schematic partial section obtained by cutting the reactor according to the first embodiment by a plane parallel to the depth direction and a width direction of the case.

FIGS. 1 and 3 are partial sections of a case 5 and a sealing resin portion 6 provided in the reactor 1 cut by a plane parallel to a depth direction of the case 5. An assembly 10 of FIGS. 1 and 3 is shown not in section, but in appearance.

Figure 2:
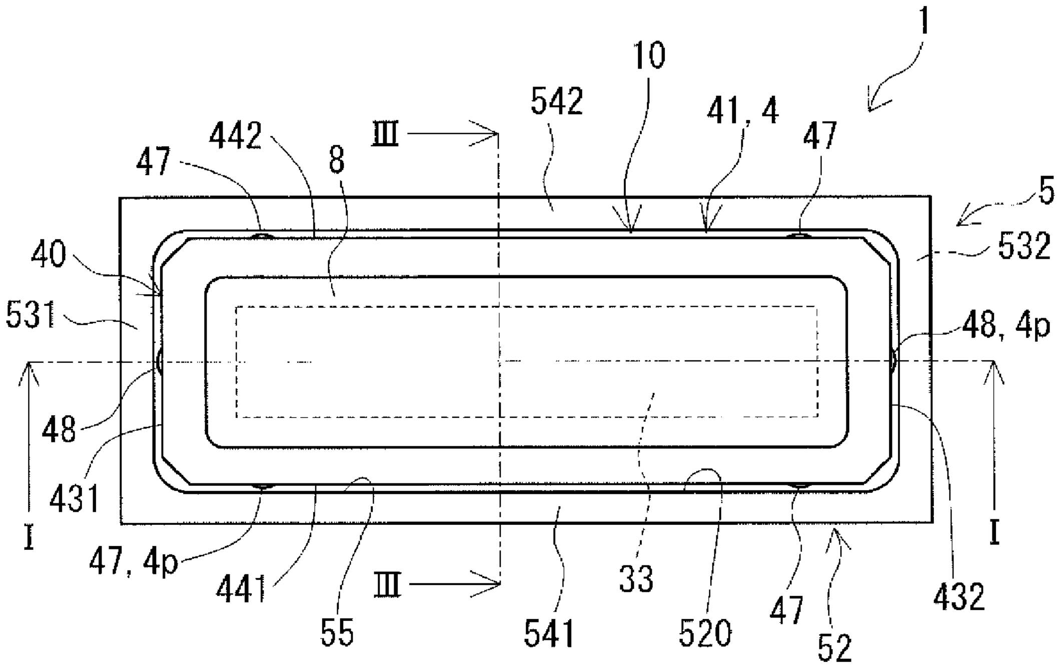
FIG. 2 is a schematic plan view of the reactor according to the first embodiment viewed in the depth direction of the case.

The section of FIG. 1 is equivalent to a section cut along a cutting line I-I shown in FIG. 2.

The section of FIG. 3 is equivalent to a section cut along a cutting line III-III shown in FIG. 2.

Figure 4:
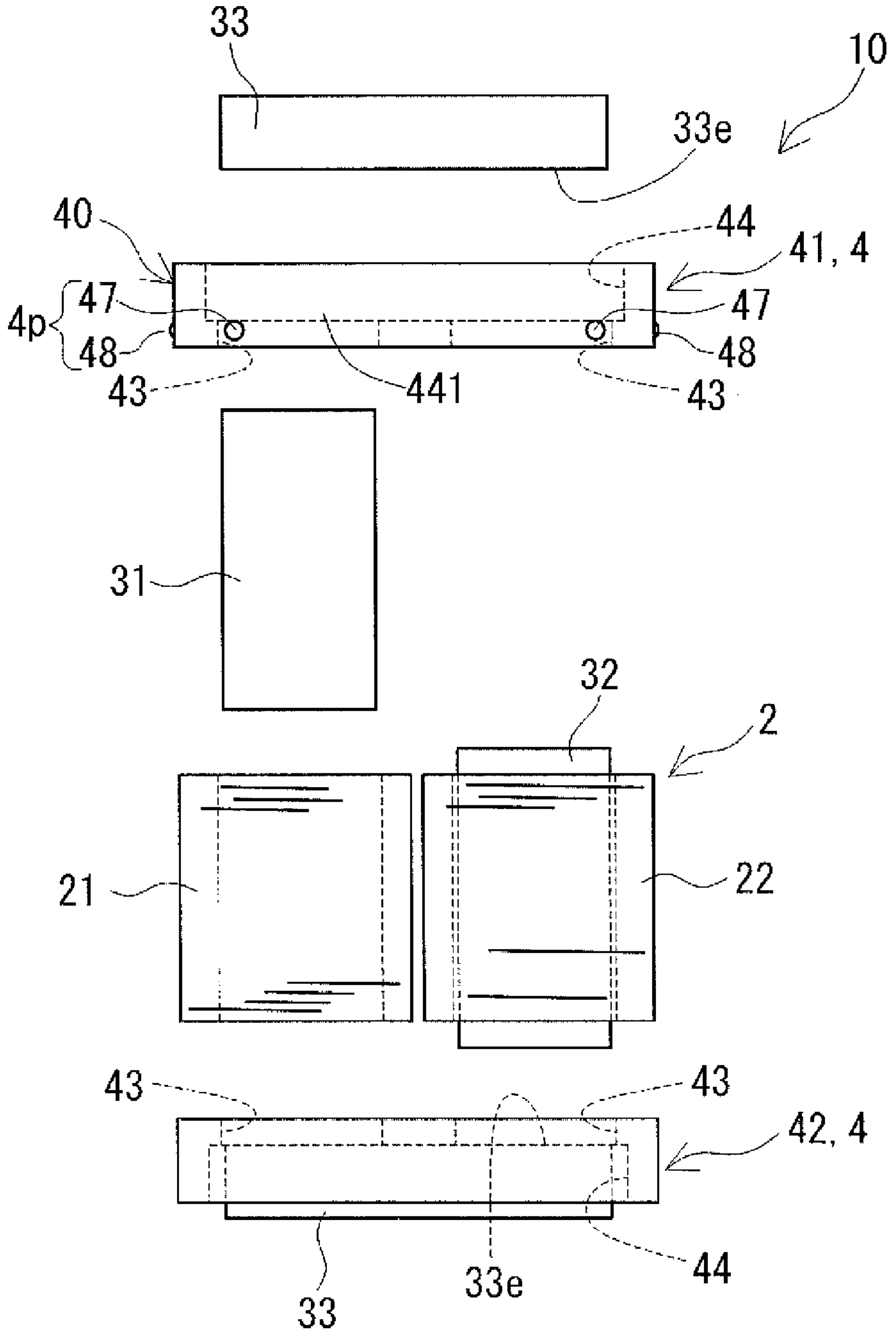
FIG. 4 is an exploded view showing a manufacturing process of an assembly shown in FIG. 1.

FIG. 4 shows, in an exploded state, a state where resin molded portions 8 to be described later are not provided in the assembly 10 provided in the reactor 1.

SUMMARY

As shown in FIG. 1, the reactor 1 includes a coil 2, a magnetic core 3, holding members 4, the case 5 and the sealing resin portion 6. The coil 2 includes a pair of winding portions 21, 22 arranged in parallel. The magnetic core 3 is arranged inside and outside the winding portions 21, 22. The holding members 4 specify mutual positions of the coil 2 and the magnetic core 3. The case 5 accommodates an assembly 10 including the coil 2, the magnetic core 3 and the holding members 4. The case 5 includes a bottom plate portion 51, a side wall portion 52 and an opening 55. The assembly 10 is placed on the bottom plate portion 51. The side wall portion 52 surrounds the assembly 10. The opening 55 is open while facing the bottom plate portion 51. The sealing resin portion 6 is filled into the case 5. Note that the sealing resin portion 6 is not shown in FIG. 2.

In the reactor 1 of the first embodiment, the assembly 10 is so accommodated into the case 5 that an axial direction of each winding portion 21, 22 is along a depth direction of the case 5. Hereinafter, this arrangement mode is referred to as an upright type. Out of the holding members 4, a holding member 41 arranged on the side of the opening 55 of the case 5 in the assembly 10 includes at least one projection 4*p* projecting toward an inner peripheral surface 520 of the side wall portion 52 of the case 5. The projections 4*p* are embedded in the sealing resin portion 6. The projections 4*p* contribute to locally narrowing an interval between an outer peripheral surface 100 of the assembly 10 and the inner peripheral surface 520 of the case 5 on the side of the opening 55 of the case 5. A displacement range of the assembly 10 in the aforementioned intersecting direction in the case 5 is restricted by such projections 4*p*.

The configuration of the reactor 1 of the first embodiment is described in detail below.

In the following description, the side of the bottom plate portion 51 of the case 5 is a lower side and a side opposite to the side of the bottom plate portion 51, i.e. the side of the opening 55, is an upper side.

The depth direction of the case 5 is a vertical direction. This vertical direction, i.e. a vertical direction in FIGS. 1 and 3, may be called a height direction.

Further, a direction orthogonal to the height direction and along long side parts 541, 542 shown in FIG. 2 in the side wall portion 52 of the case 5 is referred to as a length direction. As shown in FIG. 2, the long side parts 541, 542 are parts along a long side direction of a virtual rectangle in the side wall portion 52 when a minimum rectangle enclosing the opening 55 in a plan view of the case 5 in the depth direction is the virtual rectangle. Short side parts 531, 532 to be described later are parts along a short side direction of the virtual rectangle in the side wall portion 52. A plan view means a state viewed from the depth direction of the case 5 below.

A direction orthogonal to the height direction and along the short side parts 531, 532 of the side wall portion 52 of the case 5 is referred to as a width direction.

The length direction is a lateral direction in FIGS. 1 and 2. The width direction is a vertical direction in FIG. 2 and a lateral direction in FIG. 3.

Note that the height direction, length direction and width direction are similarly applied to second and third embodiments to be described later and FIGS. 5A to 10.

(Assembly)

The assembly 10 of this example includes molded resin portions 8 to be described later in addition to the coil 2, the magnetic core 3 and the holding members 4.

The assembly 10 of this example has a rectangular parallelepiped shape in appearance. Particularly, a length of the assembly 10 is larger than a width thereof. Further, a height of the assembly 10 is larger than the width thereof and substantially equal to the length thereof. Quantitatively, in the assembly 10, a ratio of the height to the length is about 1.0 and a ratio of the height to the width exceeds 1.0. The length, width and height of the assembly 10 here are as follows. A rectangle enclosing the assembly 10 is virtually defined in a plan view from the axial direction of the winding portions 21, 22 or in a plan view from the depth direction of the case 5 with the assembly 10 accommodated in the case 5. The length of the assembly 10 is a dimension along the long side direction of the virtual rectangle, i.e. a length of long sides. The width of the assembly 10 is a dimension along the short side direction of the virtual rectangle, i.e. a length of short sides. The height of the assembly 10 is a dimension along the axial direction or depth direction.

A state where the assembly 10 is accommodated in the case 5 may be called a case accommodated state.

If at least one of the ratio of the height to the length and the ratio of the height to the width exceeds 1.0, a height from a surface of the assembly 10 arranged on the side of an inner bottom surface 510 of the case 5, i.e. an end surface 105 is large. Such an assembly 10 can be said to have a vertically long shape. It can be said that the vertically long assembly 10 easily vibrates in the aforementioned intersecting direction. It can be also said that, at the time of vibration in the intersecting direction, an amplitude in a region on the side of the opening 55 of the case 5 tends to be large in the assembly 10.

As the value of the above ratio increases, the amplitude tends to increase. However, if a volume of the assembly 10 is fixed, an area of the end surface 105 of the assembly 10 tends to be smaller as the value of the above ratio increases. As a result, an area of the inner bottom surface 510 of the case 5 also tends to become smaller. If the bottom plate portion 51 of the case 5 is an installation surface of the reactor 1, an installation area tends to become smaller. In terms of reducing the installation area, at least one of the ratio of the height to the length and the ratio of the height to the width may be 1.2 or more, 1.5 or more, 1.8 or more or 2.0 or more. In the reactor 1 of the first embodiment, the aforementioned amplitude is reduced by the projections 4*p* even if the assembly 10 has a vertically long shape.

In terms of the aforementioned amplitude reduction, at least one of the ratio of the height to the length and the ratio of the height to the width may be, for example, 5.0 or less, 4.5 or less or 4.0 or less. In this example, the ratio of the height to the width is 5.0 or less.

(Coil)

The coil 2 includes the pair of winding portions 21, 22. The winding portions 21, 22 are formed by spirally winding a winding wire. The both winding portions 21, 22 are so arranged side by side that the axial directions thereof are parallel. In the aforementioned case accommodated state, the axial directions of the both winding portions 21, 22 coincide with the height direction.

The both winding portions 21, 22 may be constituted by one continuous winding wire. In this case, for example, after one winding portion 21 is formed, the winding wire is bent and folded on the side of a first end surface of the winding portion 21 and the other winding portion 22 is formed. Alternatively, the respective winding portions 21, 22 may be constituted by separate winding wires. In this case, after the respective winding portions 21, 22 are formed by winding the respective winding wires, end parts of the winding wires may be connected on the side of first end surfaces of the respective winding portions 21, 22. A joining method such as welding, crimping, soldering or brazing can be utilized for this connection.

End parts of the winding wires arranged on the side of second end surfaces of the winding portions 21, 22 are pulled out to outside from the side of the opening 55 of the case 5. Unillustrated terminal fittings are mounted on the tips of the pulled out winding wires. An unillustrated external device such as a power supply is connected to the terminal fittings. Note that only the winding portions 21, 22 are shown and end parts of the winding wires and the like are not shown in FIG. 1 and the like.

The winding wire may be a coated wire including a conductor wire and an insulation coating. A constituent material of the conductor wire may be copper or the like. A constituent material of the insulation coating may be a resin such as polyamide-imide. The coated wire may be a coated flat rectangular wire having a rectangular cross-sectional shape, a coated round wire having a circular cross-sectional shape or the like.

The both winding portions 21, 22 of this example are made of the winding wires having the same specifications and have the same shape, size, winding direction and number of turns. Further, the winding portion 21, 22 of this example is an edge-wise coil in the form of a rectangular tube formed by winding a coated flat rectangular wire in an edge-wise manner. Although the winding portion 21, 22 has a rectangular tube shape in this example, there is no particular limitation. The winding portion 21, 22 may have, for example, a hollow cylindrical shape, a hollow elliptical cylindrical shape or a hollow oval cylindrical shape. Further, the specifications of the winding wires forming the both winding portions 21, 22 and the shapes of the both winding portions 21, 22 may be different.

In this example, the winding portion 21, 22 has a rectangular end surface shape when viewed from the axial direction. That is, the outer peripheral surface of the winding portion 21, 22 has four flat surfaces and four corner parts. The outer peripheral surface of the winding portion 21, 22 is substantially constituted by flat surfaces. Thus, flat surfaces are facing each other between the outer peripheral surface of the winding portion 21, 22 and the inner peripheral surface 520 of the case 5 (FIGS. 1 and 3). Accordingly, a large facing area of the winding portion 21, 22 and the side wall portion 52 of the case 5 is easily secured. Further, an interval between the outer peripheral surface of the winding portion 21, 22 and the inner peripheral surface 520 of the case 5 tends to be uniformly small. Note that the corner parts of the winding portion 21, 22 are rounded.

The coil 2 is so arranged that the respective axial directions of the both winding portions 21, 22 are orthogonal to the bottom plate portion 51 of the case 5 and a parallel direction of the both winding portions 21, 22 is along the long side parts 541, 542 in the side wall portion 52 of the case 5. That is, the both winding portions 21, 22 are arranged side by side in the length direction of the case 5. In this example, one winding portion 21 is arranged on the side of one short side part 531, i.e. on a left side in FIG. 1. The other winding portion 22 is arranged on the side of the other short side part 532, i.e. on a right side in FIG. 1.

<Magnetic Core>

The magnetic core 3 of this example includes inner core portions 31, 32 and a pair of outer core portions 33, 33. The inner core portions 31, 32 mainly constitute parts to be arranged inside the respective winding portions 21, 22. End parts in the axial direction of the inner core portions 31, 32 project from end surfaces of the winding portions 21, 22. The outer core portions 33, 33 are arranged outside the both winding portions 21, 22. The outer core portions 33, 33 are provided to connect end parts of the both inner core portions 31, 32. In this example, the outer core portions 33, 33 are respectively arranged to sandwich the both inner core portions 31, 32 from both ends (see also FIG. 4). The magnetic core 3 is formed into an annular shape by connecting the respective end surfaces of the both inner core portions 31, 32 and respective inner end surfaces **33*e* (see also FIG. 4) of the outer core portions 33, 33. If the coil 2 is excited, a magnetic flux flows in the magnetic core 3** to form a closed magnetic path.

(Inner Core Portions)

The inner core portions 31, 32 of this example are shaped to substantially correspond to the inner peripheral shapes of the winding portions 21, 22. Clearances are present between the inner peripheral surfaces of the winding portions 21, 22 and the outer peripheral surfaces of the inner core portions 31, 32. A resin for constituting the molded resin portions 8 to be described later is filled into these clearances. In this example, the inner core portions 31, 32 have a quadrangular prism shape, more specifically a rectangular parallelepiped shape. The inner core portions 31, 32 have a rectangular end surface shape when viewed from the axial direction. Corner parts of the inner core portions 31, 32 are rounded to extend along the corner parts of the winding portions 21, 22. The both inner core portions 31, 32 have the same shape and size. Both end parts of the inner core portions 31, 32 projecting from the end surfaces of the winding portions 21, 22 are inserted into through holes 43 of the holding members 41, 42 to be described later (see also FIG. 4).

In this example, each of the inner core portions 31, 32 is constituted by one column-like core piece. Each core piece constituting the inner core portion 31, 32 has a length substantially equal to the entire length in the axial direction of the winding portion 21, 22. That is, the inner core portion 31, 32 is not provided with a magnetic gap member. Note that the inner core portion 31, 32 may be constituted by a plurality of core pieces and magnetic gap member(s) interposed between adjacent ones of the core pieces.

(Outer Core Portions)

The shapes of the outer core portions 33, 33 are not particularly limited as long as the outer core portions 33, 33 are shaped to connect the respective end parts of the both inner core portions 31, 32. In this example, the outer core portions 33, 33 have a rectangular parallelepiped shape. Further, the outer core portions 33, 33 have the inner end surface **33*e* facing the respective end surfaces of the both inner core portions 31, 32. The both outer core portions 33, 33 have the same shape and size. Each of the outer core portions 33, 33** is constituted by one column-like core piece.

One outer core portion 33 is arranged outside the winding portions 21, 22 and on the side of the opening 55 of the case 5, i.e. on an upper side in FIG. 1. The other outer core portion 33 is arranged outside the winding portions 21, 22 and on the side of the bottom plate portion 51 of the case 5, i.e. on a lower side in FIG. 1. The outer end surface of the outer core portion 33 on the side of the bottom plate portion 51 is arranged to face the inner bottom surface 510 of the bottom plate portion 51.

<Constituent Material>

The inner core portions 31, 32 and the outer core portions 33, 33 are formed by compacts containing a soft magnetic material. Examples of the soft magnetic material include metals such as iron and iron alloy and non-metals such as ferrite. The iron alloy is, for example, a Fe—Si alloy, a Fe—Ni alloy or the like. Examples of the compact including the soft magnetic material include powder compacts and compacts of composite materials.

A powder compact is obtained by compression-molding a powder made of the soft magnetic material, i.e. a soft magnetic powder. The powder compact has a higher rate of the soft magnetic powder in the core piece than the composite material.

In a compact of a composite material, the soft magnetic powder is dispersed in a resin. The compact of the composite material is obtained by filling a raw material, in which the soft magnetic powder is mixed and dispersed in an unsolidified resin, into a mold and solidifying the resin. Magnetic characteristics, e.g. relative magnetic permeability and saturation flux density of the composite material are easily controlled by adjusting the content of the soft magnetic powder in the resin.

The soft magnetic powder is an aggregate of soft magnetic particles. The magnetic particles may be coated particles having insulation coatings on the surfaces thereof. A constituent material of the insulation coatings may be a phosphate.

The resin of the composite material is, for example, a thermosetting resin or thermoplastic resin. Examples of the thermosetting resin include an epoxy resin, a phenol resin, a silicone resin and a urethane resin. Examples of the thermoplastic resin include a polyphenylene sulfide (PPS) resin, a polyamide (PA) resin, a liquid crystal polymer (LCP), a polyimide (PI) resin and a fluororesin. Examples of the PA resin include nylon 6, nylon 66 and nylon 9T. The composite material may contain a filler in addition to the resin. By containing the filler, the heat dissipation of the composite material can be improved. A powder made of a nonmagnetic material such as ceramics and carbon nanotubes can be, for example, utilized as the filler. Examples of the ceramics include oxides, nitrides and carbides of metals or non-metals. Examples of the oxides include alumina, silica and magnesium oxide. Examples of the nitrides include silicon nitride, aluminum nitride and boron nitride. Examples of the carbides include silicon carbide.

The constituent material of the inner core portions 31, 32 and that of the outer core portions 33, 33 may be the same or may be different. For example, any of the inner core portions 31, 32 and the outer core portions 33, 33 may be a compact of a composite material and the material and content of the soft magnetic powder in each composite material may be different. In this example, the inner core portions 31, 32 are constituted by compacts of the composite material and the outer core portions 33, 33 are constituted by powder compacts. Further, the magnetic core 3 of this example includes no magnetic gap member.

(Holding Members)

The reactor 1 of this example includes two holding members 41, 42 as shown in FIGS. 1, 3 and 4 as the holding members 4. The holding member 41, 42 includes a frame plate to be described later. The frame plate is a part to be arranged to face the respective end surfaces of the both winding portions 21, 22. Further, the holding member 41, 42 includes an outer wall portion 40 to be described later. The outer wall portion 40 is a part for surrounding the outer peripheral surface of the outer core portion 33. One holding member 41 is arranged on the side of the opening 55 of the case 5 to surround the upper outer core portion 33. The other holding member 42 is arranged on the side of the bottom plate portion 51 of the case 5 to surround the lower outer core portion 33.

Either of the holding members 41, 42 of this example is a member which can be assembled with the coil 2 and the magnetic core 3. The holding members 41, 42 are assembled with the coil 2 and the magnetic core 3 to ensure electrical insulation between the winding portions 21, 22 of the coil 2 and the inner core portions 31, 32 and the outer core portions 33, 33 of the magnetic core 3. Further, the holding members 41, 42 restrict mutual positions of the coil 2 and the magnetic core 3 to maintain a positioned state. Further, one holding member 41 reduces an amplitude during the vibration of the assembly 10 by the projections 4*p*.

The both holding members 41, 42 have the same basic configuration except that the holding member 41 on the side of the opening 55 of the case 5 includes the projections 4*p* and the holding member 42 on the side of the bottom plate portion 51 includes no projection 4*p*. Therefore, the holding members 41, 42 may be collectively referred to as the holding members 4 in the description of a common configuration.

First, the common configuration of the holding members 41, 42 is described.

The holding member 4 of this example includes the frame plate having the through holes 43, and the outer wall portion 40. The frame plate is interposed between the end surfaces of the winding portions 21, 22 and the inner end part 33*e* of the outer core portion 33. The outer wall portion 40 covers at least a part of the outer peripheral surface of the outer core portion 33, in this example, over the entire periphery.

In this example, the holding member 4 has a rectangular frame shape in a plan view as shown in FIG. 2. The outer peripheral surface of the outer wall portion 40 is substantially constituted by flat surfaces. The outer peripheral surface of the outer wall portion 40 has four flat surfaces facing the side wall portion 52 of the case 5, here, the short side parts 531, 532 and the long side parts 541, 542.

In particular, the outer wall portion 40 has first surfaces 441, 442 along a long side direction of the following virtual rectangle and second surfaces 431, 432 along a short side direction of the virtual rectangle. The above virtual rectangle is a rectangle enclosing the outer wall portion 40 in a plan view from the axial direction of the winding portions 21, 22 with the holding members 4 assembled with the coil 2 and the magnetic core 3 or in a plan view from the depth direction of the case 5 in the above case accommodated state. In this example, the first surfaces 441, 442 respectively face the inner surfaces of the long side parts 541, 542, out of the inner peripheral surface 520. The second surfaces 431, 432 respectively face the inner surfaces of the short side parts 531, 532, out of the inner peripheral surface 520.

The frame plate of this example ensures electrical insulation between the winding portions 21, 22 and the outer core portion 33. As shown in FIGS. 1 and 4, the frame plate includes a pair of the through holes 43 penetrating through the front and back surfaces of a rectangular plate. The end parts of the inner core portions 31, 32 are inserted into the respective through holes 43. The through holes 43 are shaped to substantially correspond to the outer peripheral shapes of the end parts of the inner core portions 31, 32. In this example, four corners of the through holes 43 are formed along the corner parts of the outer peripheral surfaces of the inner core portions 31, 32. The inner core portions 31, 32 are held in the through holes 43 by the four corners of these through holes 43. Further, with the end parts of the inner core portions 31, 32 inserted in the through holes 43, clearances are partially formed between the outer peripheral surfaces of the inner core portions 31, 32 and the inner peripheral surfaces of the through holes 43. There clearances communicate with the clearances between the inner peripheral surfaces of the winding portions 21, 22 and the outer peripheral surfaces of the inner core portions 31, 32.

The outer wall portion 40 of this example is a rectangular tube surrounding the peripheral edge of the frame plate, and provided to surround the entire periphery of the outer core portion 33. The outer wall portion 40 includes a recess 44 inside. A part of the outer core portion 33 on the side of the inner end surface 33*e* is fit into the recess 44. In this example, the recess 44 is provided to form a clearance partially between the outer peripheral surface of the outer core portion 33 and the inner peripheral surface of the recess 44 with the outer core portion 33 fit in the recess 44. The resin for constituting the molded resin portion 8 to be described later is filled into this clearance. The respective outer core portions 33, 33 and the respective holding members 41, 42 are integrated by these molded resin portions 8. The holding members 41, 42 of this example are so configured that the clearances between the outer core portions 33, 33 and the recesses 44 and the aforementioned clearances between the inner core portions 31, 32 and the through holes 43 communicate. By the communication of these clearances, the resin for constituting the molded resin portions 8 can be introduced into between the winding portions 21, 22 and the inner core portions 31, 32 when the molded resin portions 8 are formed.

Further, the holding member 4 of this example includes unillustrated inner interposing portions. The inner interposing portions project toward the insides of the winding portions 21, 22 from peripheral edge parts of the through holes 43 and are inserted into between the winding portions 21, 22 and the inner core portions 31, 32. The winding portions 21, 22 and the inner core portions 31, 32 are held at a distance from each other by these inner interposing portions. As a result, electrical insulation between the winding portions 21, 22 and the inner core portions 31, 32 is ensured.

As described above, by inserting the respective end parts of the inner core portions 31, 32 into the respective through holes 43 of the holding members 41, 42, the inner core portions 31, 32 are positioned with respect to the holding members 41, 42. Further, by fitting parts of the outer core portions 33, 33 on the side of the inner end surfaces 33*e* into the recesses 44 of the holding members 41, 42, the outer core portions 33, 33 are positioned. Furthermore, the winding portions 21, 22 are positioned by the above inner interposing portions. As a result, the winding portions 21, 22 of the coil 2 and the inner core portions 31, 32 and the outer core portions 33, 33 of the magnetic core 3 are held in a positioned state by the holding members 41, 42.

(Projections)

The projections 4*p* provided on the holding member 41 are provided to project toward the inner peripheral surface 520 of the case 5 from the outer wall portion 40 as shown in FIGS. 1 to 3. The holding member 41 of this example includes a plurality of the projections 47, 48. The first projections 47 are provided on the first surfaces 441, 442. That is, the first projections 47 are provided on the surfaces (FIGS. 2 and 3) facing the long side parts 541, 542. The second projections 48 are provided on the second surfaces 431, 432. That is, the second projections 48 are provided on the surfaces (FIGS. 1 and 2) facing the short side parts 531, 532.

In this example, as shown in FIGS. 1 and 2, two projections 47 are provided at a predetermined distance from each other in the length direction on each of the first surfaces 441, 442. The respective projections 47 on one first surface 441, 442 are provided at symmetrical positions with respect to a bisector of the first surface 441, 442 in the length direction. As shown in FIGS. 2 and 3, one projection 48 is provided in a widthwise center of each of the second surfaces 431, 432. The projections 47, 48 has a spherical segment shape.

The number, positions and shapes of the projections 4*p* are not particularly limited and can be appropriately selected.

For example, one projection 4*p* may be provided, but a plurality of the projections 4*p* are preferably provided as in this example. Further, it is preferred to provide one or more projections 4*p* on each of the respective surfaces 441, 442, 431, 432 constituting the outer peripheral surface of the outer wall portion 40 as in this example. Furthermore, it is preferred to provide a plurality of the projections 4*p* on each of relatively long surfaces, here, the first surfaces 441, 442 as in this example. One of reasons for this is that a displacement amount, i.e. an amplitude, of the assembly 10 in an arbitrary intersecting direction is easily reduced when the assembly 10 vibrates in the intersecting direction. Particularly, if the inner peripheral surface 520 of the side wall portion 52 is inclined to widen from the side of the bottom plate portion 51 toward the side of the opening 55 as described later, the aforementioned amplitude can be effectively reduced by the projections 4*p*. Another reason is, for example, that excessive inclination of the assembly 10 in the case 5 can be suppressed by the contact of the projections 4*p* with the inner peripheral surface 520 of the side wall portion 52, here the inner surfaces of the long side parts 541, 542 and the inner surfaces of the short side parts 531, 532.

The positions of the projections 4*p* are, for example, near the opening 55 of the case 5 in the aforementioned case accommodated state along the axial directions of the through holes 43, i.e. along the depth direction. The closer to the opening 55 the positions of the projections 4*p* are in the depth direction, the more easily an effect of reducing the aforementioned amplitude by the projections 4*p* is obtained. Examples of the positions in the depth direction include positions closer to the opening 55 than a bisector between an edge on the side of the opening 55 of the case 5 and an edge on the side of the bottom plate portion 51 of the case 5, out of the peripheral edge of the outer wall portion 40 of the holding member 41, in the above case accommodated state. The above bisector is a bisector between the upper end edge and the lower end edge of the outer wall portion 40 shown in FIG. 1. In this example, the positions in the depth direction are closer to the bottom plate portion 51 than the bisector. In this case, a filling amount of the sealing resin portion 6 can be reduced. The reason for this is that the filling amount of the sealing resin portion 6 is adjusted to embed at least the projections 4*p*.

For example, out of the positions of the projections 4*p*, the positions along an arrangement direction of the two through holes 43, i.e. the positions in the length direction on the first surfaces 441, 442 are, for example, near ridges between the first surfaces 441, 442 and the second surfaces 431, 432. The closer to the ridges the positions in the length direction are, i.e. the more separated these positions are along the arrangement direction from the bisectors of the first surfaces 441, 442 in the length direction, the more easily the aforementioned effect of reducing the amplitude by the projections 4*p* is obtained. In this example, the positions in the length direction are points away from the ridges along the arrangement direction by 10% or more and 25% or less of the lengths of the first surfaces 441, 442.

If the holding member 41 includes the plurality of projections 4*p*, these projections 4*p* may include projections 4*p* at different positions in the depth direction. For example, the plurality of projections 47 may be arranged in a staggered manner on at least one of the first surfaces 441, 442. If all the projections 4*p* are at the same position in the depth direction as in this example, molding conditions of the projections 4*p* are easily adjusted. In this respect, the holding member 41 is excellent in manufacturability.

For example, the projection 4*p* may have a shape other than the spherical segment shape. However, if the holding member 41 includes the plurality of projections 4*p*, at least one projection 4*p* preferably has a spherical segment shape. More preferably, all the projections 4*p* have a spherical segment shape as in this example. One of reasons for this is that the projections 4*p* are in point contact with the inner peripheral surface 520 of the case 5 and a contact area is small Another reason is that the shear of the sealing resin portion 6 and the damage of the inner peripheral surface 520 by the projections 4*p* can be prevented at the time of vibration.

A spherical segment is a solid obtained by cutting a sphere by a plane and has a circular surface and a curved surface constituting a part of a spherical surface. The projection 4*p* having a spherical segment shape has a surface constituted by the curved surface. In a hemisphere, a diameter of the circular surface is equivalent to a diameter of a sphere. The projection 4*p* may have a semispherical shape or curved surface shape in which a diameter of the above circular surface is smaller than the diameter of the sphere. Other than the spherical segment shape, the shape of the projection 4*p* is, for example, a pyramid shape such as a polygonal pyramid shape or a conical shape, a truncated pyramid shape such as a polygonal pyramid shape or a truncated conical shape, or a column shape such as a prism shape or a cylindrical shape.

If the holding member 41 includes the plurality of projections 4*p*, these projections 4*p* may include differently shaped projections 4*p*. If all the projections 4*p* have the same shape as in this example, molding conditions of the projections 4*p* are easily adjusted. In this respect, the holding member 41 is excellent in manufacturability.

Projection amounts of the projections 4*p* from the outer peripheral surface of the outer wall portion 40 may be appropriately set according to the size of an interval between the outer peripheral surface of the outer wall portion 40 and the inner peripheral surface 520 of the side wall portion 52 so that a predetermined interval is provided between these peripheral surfaces. In this example, the projection amounts of the projections 47 may be adjusted according to intervals between the first surfaces 441, 442 and the inner surfaces of the large side parts 541, 542, out of the inner peripheral surface 520. The projection amounts of the projections 48 may be adjusted according to intervals between the second surfaces 431, 432 and the inner surfaces of the small side parts 531, 532, out of the inner peripheral surface 520.

As the aforementioned projection amounts of the projections 4*p* increase, the interval between the outer peripheral surface 100 of the assembly 10 and the inner peripheral surface 520 of the case 5 tends to become large. Thus, electrical insulation between the outer peripheral surfaces of the winding portions 21, 22 and the inner peripheral surface 520 of the case 5 is enhanced. Further, the resin, which will become the sealing resin portion 6, easily flows into between the outer peripheral surface 100 of the assembly 10 and the inner peripheral surface 520 of the case 5 in a manufacturing process of the reactor 1. As the projection amounts decrease, the above interval tends to become smaller. As a result, a length and a width of the case 5 tend to decrease. The above projection amounts are, for example, 0.5 mm or more and 1.5 mm or less.

The above projection amounts of the projections 4*p* are, for example, so adjusted that the projections 4*p* and the inner peripheral surface 520 of the case 5 do not contact each other when the reactor 1 is in a stationary state without vibration. In this case, even if the assembly 10 or the case 5 vibrates, the projections 4*p* and the case 5 are less likely to contact. Thus, vibration is less likely to be transmitted between the assembly 10 and the case 5. In this respect, the projections 4*p* can be said to contribute to reducing the vibration of the assembly 10. Further, such projections 4*p* contribute to ensuring the interval between the outer peripheral surface 100 of the assembly 10 and the inner peripheral surface 520 of the case 5 larger than the projection amounts. The above interval is substantially equivalent to a thickness of the sealing resin portion 6. Thus, the projections 4*p* also contribute to controlling the thickness of the sealing resin portion 6. Further, since the above interval is somewhat large, electrical insulation between the winding portions 21, 22 and the inner peripheral surface 520 of the case 5 is enhanced.

None of the projections 47, 48 of this example is in contact with the inner peripheral surface 520 in the above stationary state as shown in FIG. 2. Thus, the contact of the winding portions 21, 22 and the both large side parts 541, 542, the contact of the winding portion 21 and the small side part 531 and the contact of the winding portion 22 and the small side part 532 are prevented. Further, the intervals between the both winding portions 21, 22 and the both large side parts 541, 542 can be properly maintained by the projections 47. The interval between the winding portion 21 and the small side part 531 and the interval between the winding portion 22 and the small side part 532 can be properly maintained by the projections 48.

If the holding member 41 includes the plurality of projections 4*p*, these projections 4*p* may include those having different projection amounts depending on the positions thereof. In this case, at least one projection 4*p* is preferably not in contact with the inner peripheral surface 520 of the case 5. If all the projections 4*p* have the same projection amount as in this example, molding conditions of the projections 4*p* are easily adjusted. In this respect, the holding member 41 is excellent in manufacturability.

Note that the projections 4*p* may be provided in contact with the inner peripheral surface 520 of the case 5 in the aforementioned stationary state. By the contact of the projections 4*p* with the inner peripheral surface 520, the assembly 10 can be positioned with respect to the case 5. In particular, the projections 47 can be used to position the assembly 10 in the width direction with respect to the case 5. The projections 48 can be used to position the assembly 10 in the length direction with respect to the case 5. Further, the interval corresponding to the above projection amounts is reliably provided between the outer peripheral surface 100 of the assembly 10 and the inner peripheral surface 520 of the case 5. However, in terms of preventing vibration transmission between the assembly 10 and the case 5, the projections 4*p* are desirably not in contact with the inner peripheral surface 520 of the case 5 in the aforementioned stationary state.

<Constituent Material>

Examples of a constituent material of the holding members 4 include electrically insulating materials. Resins are typical examples of the electrically insulating materials. Specific examples of resins include thermosetting resins and thermoplastic resins. Examples of thermosetting resins include an epoxy resin, a phenol resin, a silicone resin, a urethane resin and an unsaturated polyester resin. Examples of thermoplastic resins include a PPS resin, a PA resin, an LCP, a PI resin, a fluororesin, a polytetrafluoroethylene (PTFE) resin, a polybutylene terephthalate (PBT) resin and an acrylonitrile-butadiene-styrene (ABS) resin. The constituent material of the holding members 4 may contain a filler in addition to the resin. By containing the filler, the heat dissipation of the holding members 4 can be improved. For specific examples of the filler, the section of the composite material may be referred to. In this example, the constituent material of the holding members 4 is the PPS resin.

(Molded Resin Portions)

The assembly 10 of this example includes, as shown in FIG. 1, the molded resin portions 8. The molded resin portions 8 cover at least parts of the outer peripheral surfaces of the outer core portions 33, 33 and are interposed between the inner peripheral surfaces of the winding portions 21, 22 and the outer peripheral surfaces of the inner core portions 31, 32. The inner core portions 31, 32 and the outer core portions 33 are integrally held by these molded resin portions 8. As a result, the winding portions 21, 22 of the coil 2 and the inner core portions 31, 32 and the outer core portions 33 of the magnetic core 3 are integrated. Thus, the coil 2 and the magnetic core 3 can be handled as an integrated body. Further, the respective outer core portions 33, 33 and the respective holding members 41, 42 are integrated by the molded resin portions 8. That is, in this example, the coil 2, the magnetic core 3 and the holding members 41, 42 are integrated by the molded resin portions 8. Thus, the assembly 10 can be handled as an integrated object. Note that the outer peripheral surfaces of the winding portions 21, 22 are not covered by the molded resin portions 8 and are exposed from the molded resin portions 8.

The molded resin portions 8 only have to be able to integrally hold the inner core portions 31, 32 and the outer core portions 33, 33. The molded resin portions 8 need not to cover the surfaces of the inner core portions 31, 32 along a circumferential direction, i.e. the outer peripheral surfaces of the inner core portions 31, 32, over the entire length. In view of the function of the molded resin portions 8 to integrally hold the inner core portions 31, 32 and the outer core portions 33, 33, formation ranges of the molded resin portions 8 may extend up to the vicinities of the end parts of the inner core portions 31, 32. That is, the molded resin portions 8 do not extend up to axially central parts of the inner core portions 31, 32 and only have to cover at least end parts of the outer peripheral surfaces of the inner core portions 31, 32. Of course, the molded resin portions 8 may extend up to the axially central parts of the inner core portions 31, 32. In this case, the molded resin portions 8 cover the outer peripheral surfaces of the inner core portions 31, 32 over the entire length and are formed from one outer core portion 33 to the other outer core portion 33.

Further, the assembly 10 of this example includes the end surface 105 facing the bottom plate portion 51 of the case 5 and leg portions 49. The leg portions 49 project from the end surface 105 toward the inner bottom surface 510 of the bottom plate portion 51. The end surface 105 and the leg portions 49 of this example are constituted by the molded resin portion 8. The leg portions 49 contribute to reducing a contact area of the end surface 105 of the assembly 10 and the inner bottom surface 510 of the case 5 as compared to the case where the leg portions 49 are not provided.

In this example, a total of four leg portions 49 are provided on the end surface 105 of the assembly 10, i.e. two at a predetermined distance from each other in the length direction as shown in FIG. 1 and two at a predetermined distance from each other in the width direction as shown in FIG. 3. The respective leg portions 49 are provided at symmetrical positions with respect to a bisector of the end surface 105 in the length direction and are provided at symmetrical positions with respect to a bisector of the end surface 105 in the width direction. Further, the respective leg portions 49 are provided near corner parts of the rectangular end surface 105. The leg portions 49 have a spherical segment shape.

The number, positions and shapes of the leg portions 49 are not particularly limited and can be appropriately selected.

If the plurality of leg portions 49 are provided as in this example, the assembly 10 is stably placed on the inner bottom surface 510 of the case 5. Thus, the assembly 10 is less likely to vibrate. As the number of the leg portions 49 increases, the assembly 10 is more stably placed. As the number of the leg portions 49 decreases, the contact area of the assembly 10 and the inner bottom surface 510 tends to become smaller.

If the leg portions 49 are provided at the symmetrical positions on the end surface 105 as in this example, the assembly 10 is less likely to vibrate since the assembly 10 is stably placed on the inner bottom surface 510 of the case 5. Further, if the leg portions 49 are provided not at center positions of the end surface 105, but at the positions near the peripheral edge of the end surface 105 as in this example, the placed state of the assembly 10 is easily stabilized.

The leg portions 49 may have a shape other than the spherical segment shape. However, if the assembly 10 includes the plurality of leg portions 49, at least one leg portion 49 preferably has the spherical segment shape. More preferably, all the leg portions 49 have the spherical segment shape as in this example. The reason for this is that the leg portions 49 are in point contact with the inner bottom surface 510 of the case 5 and the contact area tends to become small Note that although the leg portions 49 having different shapes may be provided, if all the leg portions 49 have the same shape as in this example, molding conditions of the leg portions 49 are easily adjusted. In this respect, the molded resin portion 8 is excellent in manufacturability.

Projection amounts of the leg portions 49 from the end surface 105 may be appropriately set according to the size of an interval between the end surface 105 and the inner bottom surface 510 of the bottom plate portion 51 so that a predetermined interval is provided between the end surface 105 and the inner bottom surface 510. As the projection amounts increase, the interval between the end surface 105 of the assembly 10 and the inner bottom surface 510 of the case 5 tends to become larger. Thus, electrical insulation between the end surface 105 of the assembly 10 and the inner bottom surface 510 of the case 5 is enhanced. Further, in the manufacturing process of the reactor 1, the resin, which will become the sealing resin portion 6, easily flows into between the end surface 105 of the assembly 10 and the inner bottom surface 510 of the case 5. As the projection amounts decrease, the interval tends to become smaller. As a result, the height of the case 5 tends to become smaller. The projection amounts are, for example, 0.5 mm or more and 1.5 mm or less.

<Constituent Material>

The resin described in the section of the holding members 4 can be used as the resin for constituting the molded resin portions 8. A constituent material of the molded resin portions 8 may contain the aforementioned filler in addition to the resin. In this example, the molded resin portions 8 are made of a PPS resin.

(Case)

By accommodating the assembly 10 as shown in FIG. 1, the case 5 can mechanically protect the assembly 10 and protect the assembly 10 from an external environment. Protection from the external environment aims to improve corrosion resistance and the like. The case 5 of this example is made of metal. Metals are higher in thermal conductivity than resins. Thus, the case 5 made of metal easily dissipates the heat of the assembly 10 to outside via the case 5. Therefore, the case 5 made of metal contributes to an improvement in the heat dissipation of the assembly 10.

The case 5 includes the bottom plate portion 51, the side wall portion 52 and the opening 55. The case 5 is a bottomed tubular container including the opening 55 on the side facing the bottom plate portion 51.

In this example, the bottom plate portion 51 is a flat plate member, on which the assembly 10 is placed. The side wall portion 52 is a rectangular tube body for surrounding the assembly 10. An accommodation space for the assembly 10 is formed by the bottom plate portion 51 and the side wall portion 52. In this example, the bottom plate portion 51 and the side wall portion 52 are integrally formed. The side wall portion 52 has a height equal to or more than that of the assembly 10.

In particular, the bottom plate portion 51 of this example is in the form of a rectangular plate. In the bottom plate portion 51, the inner bottom surface 510 on which the assembly 10 is placed is substantially constituted by a flat surface. The side wall portion 52 of this example is in the form of a rectangular tube (see FIG. 2). The side wall portion 52 includes the pair of long side parts 541, 542 facing each other and the pair of short side parts 531, 532 facing each other. In the case of this example, out of the inner peripheral surface 520 of the side wall portion 52, the surfaces of the long side parts 541, 542 and the short side parts 531, 532 facing the winding portions 21, 22 are substantially constituted by flat surfaces.

Figure 5A:
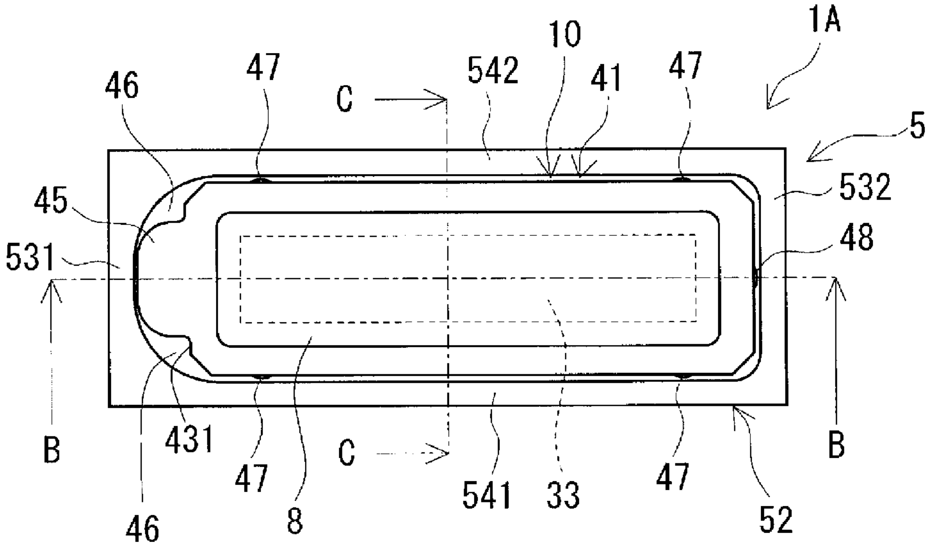
FIG. 5A is a schematic plan view of a reactor according to a second embodiment.

The side wall portion 52 of this example has a substantially rectangular tube shape in a plan view (see FIG. 2). The substantially rectangular tube shape means that the inner peripheral surface 520 of the side wall portion 52 has a substantially rectangular shape when the case 5 is viewed from above. The rectangular shape here may not be rectangular in a geometrically strict sense and may include a range of rectangular shapes regarded to be substantially rectangular, including shapes having rounded corner parts and chamfered corner parts. In this example, corner parts of the inner bottom surface 520 are rounded. As in a second embodiment to be described later, the corner parts of the inner peripheral surface 520 may be constituted by curved surfaces having a relatively large radius of curvature (FIG. 5A).

The inner peripheral surface 520 of the side wall portion 52 may be inclined to widen from the side of the bottom plate portion 51 toward the side of the opening 55. More specifically, at least either the inner surfaces of the long side parts 541, 542 or the inner surfaces of the short side parts 531, 532 of the side wall portion 52 are inclined to be more spaced apart from each other from the side of the bottom plate portion 51 toward the side of the opening 55. That is, at least one of the inner surfaces of the long side parts 541, 542 and the inner surfaces of the short side parts 531, 532 of the side wall portion 52 may be inclined outwardly of the case 5 with respect to a perpendicular direction to the inner bottom surface 510 of the bottom plate portion 51. Note that the above perpendicular direction is equivalent to the height direction of the case 5.

If the respective inner surfaces of the long side parts 541, 542 and the short side parts 531, 532 are inclined to be more spaced apart from each other from the side of the bottom plate portion 51 toward the side of the opening 55, the assembly 10 is easily accommodated into the case 5 in the manufacturing process of the reactor 1. Further, in the case of manufacturing the case 5 made of metal by die casting, the case 5 is easily removed from a mold if at least one of the respective inner surfaces of the long side parts 541, 542 and the short side parts 531, 532 is inclined. In this example, all the inner surfaces of the long side parts 541, 542 and the short side parts 531, 532 are inclined to widen the inner peripheral surface 520 of the side wall portion 52 from the side of the bottom plate portion 51 toward the side of the opening 55 (see FIGS. 1 and 3).

Angles of inclination between the respective inner surfaces of the long side parts 541, 542 and the short side parts 531, 532 and a perpendicular to the inner bottom surface 510 of the bottom plate portion 51 can be appropriately selected. The angles of inclination are, for example, 0.5° or more and 5° or less and, further, 1° or more and 2° or less. As the angles of inclination increase, the interval between the outer peripheral surface 100 of the assembly 10 and the inner peripheral surface 520 of the side wall portion 52 becomes larger on the side of the opening 55. However, in the reactor 1 of the first embodiment, the above interval is reliably narrowed by the projections 4*p* even if the inner peripheral surface 520 of the case 5 has the above inclined shape. Thus, the aforementioned amplitude of the assembly 10 tends to be small. However, as the above interval becomes larger, the heat of the assembly 10 on the side of the opening 55 is less likely to be transferred to the case 5. Thus, heat transfer efficiency tends to be reduced. That is, excessive angles of inclination are not preferable in terms of heat dissipation. Therefore, an upper limit of the angles of inclination is set to be 5° or less and, further, 2° or less.

The length, width, height and volume of the case 5 can be appropriately selected.

The length of the case 5 is, for example, 80 mm or more and 120 mm or less and, further, 90 mm or more and 115 mm or less.

The width of the case 5 is, for example, 30 mm or more and 80 mm or less and, further, 35 mm or more and 70 mm or less.

The height of the case 5 is, for example, 70 mm or more and 140 mm or less and, further, 80 mm or more and 130 mm or less.

The volume of the case 5 is, for example, 120 $cm^2$ or more and 1200 $cm^3$ or less and, further, 200 $cm^2$ or more and 900 $cm^3$ or less.

The case 5 of this example has the length larger than the width and has the height larger than the width. Thus, an area obtained by the length×width of the case 5 is smaller than an area obtained by the length×height of the case 5. That is, an area of the bottom plate portion 51 is smaller than an area of a part along the length direction, here, an area of the long side part 541 or 542, out of an area of the side wall portion 52.

<Constituent Material>

The case 5 is made of nonmagnetic metal. Examples of nonmagnetic metal include aluminum, alloys thereof, magnesium and alloys thereof, copper and alloys thereof, silver and alloys thereof and austenite-based stainless steels. These metals are relatively high in thermal conductivity. Thus, the case 5 made of metal can be used as a heat dissipation path. The heat of the assembly 10 is efficiently dissipated to outside via the case 5. Therefore, the heat dissipation of the assembly 10 is improved. Besides metals, resins and the like can be used as the material for constituting the case 5.

The case 5 made of metal can be, for example, manufactured by die casting. The case 5 of this example is constituted by a die cast product made of aluminum.

(Arrangement Mode of Assembly)

An arrangement mode of the assembly 10 with respect to the case 5 is an upright type. In this case, as shown in FIG. 1, the assembly 10 is so accommodated into the case 5 that the respective axial directions of the both winding portions 21, 22 are orthogonal to the inner bottom surface 510 of the bottom plate portion 51. Further, the assembly 10 of this example is so accommodated into the case 5 that the parallel direction of the both winding portions 21, 22 is along the long side parts 541, 542.

If the arrangement mode of the assembly 10 is the upright type, an installation area of the assembly 10 with respect to the bottom plate portion 51 can be reduced as compared to the following horizontally placed type. The horizontally placed type is a mode described in Patent Document 1 and Patent Document 2 and an assembly is so accommodated in a case that a parallel direction and axial directions of both winding portions are orthogonal to a depth direction of the case. That is, in the horizontally placed type, the assembly is so accommodated into the case that the parallel direction and the axial directions of both winding portions are parallel to an inner bottom surface of a bottom plate portion. Generally, the size of the assembly 10 along a direction orthogonal to both the parallel direction of the both winding portions 21, 22 and the axial directions of the both winding portions 21, 22 is shorter than the size of the assembly 10 along the axial directions of the both winding portion 21, 22. That is, the width of the assembly 10 is shorter than the height of the assembly 10. Thus, the upright type can reduce the installation area of the assembly 10 as compared to the horizontally placed type. Therefore, if the arrangement mode of the assembly 10 is the upright type, the installation area of the reactor 1 can be reduced by reducing the area of the bottom plate portion 51.

Further, if the arrangement mode of the assembly 10 is the upright type, a large facing area of the winding portions 21, 22 and the side wall portion is ensured if the outer peripheral surfaces of the winding portions 21, 22 are substantially constituted by flat surfaces as in this example. Further, the intervals between the outer peripheral surfaces of the winding portions 21, 22 and the inner peripheral surface 520 of the side wall portion 52 tend to be uniform. In the case of this example, the intervals between the outer peripheral surfaces of the winding portions 21, 22 and the inner surfaces of the long side parts 541, 542, the interval between the outer peripheral surface of the winding portion 21 and the inner surface of the short side part 531 and the interval between the outer peripheral surface of the winding portion 22 and the inner surface of the short side part 532 tend to be uniform. Thus, in the reactor 1, the case 5 can be efficiently utilized as a heat dissipation path. Therefore, the reactor 1 easily dissipates the heat of the coil 2 to the case 5 and is excellent in the heat dissipation of the assembly 10.

The interval between the outer peripheral surface 100 of the assembly 10 and the inner peripheral surface 520 of the side wall portion 52 is, for example, 0.5 mm or more and 1.5 mm or less and, further, 0.5 mm or more and 1 mm or less. This interval is an interval between the outer peripheral surface of the outer wall portion 40 of the other holding member 42 located on the side of the opening 55 and the inner surfaces of the long side parts 541, 542 and the short side parts 531, 532 of the side wall portion 52. The reason for this is that, out of the assembly 10, a closest member to the inner peripheral surface 520 of the side wall portion 52, except the projections **4*p*, is the holding member 42. If the inner peripheral surface 520 of the side wall portion 52, here, the respective inner surfaces of the long side parts 541, 542 and the short side parts 531, 532, are inclined as described above, a minimum value may be adopted as the above interval. If the above interval is 0.5 mm or more, the resin, which will become the sealing resin portion 6, easily flows between the assembly 10 and the side wall portion 52. On the other hand, if the above interval is 1.5 mm or less and, further, 1 mm or less, the case 5 is easily reduced in size. Further, if the above interval is 1.5 mm or less and, further, 1 mm or less, the intervals between the outer peripheral surfaces of the winding portions 21, 22 and the inner peripheral surface 520 of the side wall portion 52 become smaller. Thus, the heat dissipation of the assembly 10** can be improved.

(Sealing Resin Portion)

The sealing resin portion 6 is filled into the case 5 and seals at least a part of the assembly 10. The assembly 10 can be mechanically protected and protected from an external environment by the sealing resin portion 6. Protection from the external environment aims to improve corrosion resistance and the like.

In this example, the sealing resin portion 6 is filled up to the opening end of the case 5. Thus, the entire assembly 10 is embedded in the sealing resin portion 6. A filling amount of the sealing resin portion 6 may be such that the projections **4*p* of the holding member 41 are embedded. A part of the assembly 10, e.g. the upper end surface of the outer core portion 33 on the side of the opening 55, may be exposed without being sealed by the sealing resin portion 6. If the projections 4*p* are embedded by the sealing resin portion 6, the winding portions 21, 22 are reliably covered up to the upper end surfaces of the winding portions 21, 22 by the sealing resin portion 6. The reason for this is that the projections 4*p* are provided on the outer wall portion 40 of the holding member 41 on the side of the opening 55. The outer wall portion 40 of the holding member 41 surrounds the outer core portion 33 located above the upper end surfaces of the winding portions 21, 22 as described above. Further, the sealing resin portion 6 is interposed between the outer peripheral surfaces of the winding portions 21, 22 of the coil 2 and the inner peripheral surface 520 of the side wall portion 52 of the case 5. In this way, the heat of the coil 2 can be transferred to the case 5 via the sealing resin portion 6. Thus, the heat dissipation of the assembly 10** is improved.

<Constituent Material>

Examples of the resin of the sealing resin portion 6 include thermosetting resins and thermoplastic resins. Examples of thermosetting resins include an epoxy resin, a urethane resin, a silicone resin and an unsaturated polyester resin. Examples of thermoplastic resins include a PPS resin. The sealing resin portion 6 of this example is made of silicone resin, more specifically, silicone gel. The higher the thermal conductivity of the sealing resin portion 6, the more preferable. The reason for this is that the heat of the coil 2 is easily transferred to the case 5. Thus, the material for constituting the sealing resin portion 6 may contain, for example, a filler as described above in addition to the above resin. Components of the above material may be adjusted to enhance the thermal conductivity of the sealing resin portion 6. The thermal conductivity of the sealing resin portion 6 is, for example, preferably 1 W/m·K or more and, further, 1.5 W/m·K or more.

<Manufacturing Method>

With appropriate reference to FIG. 4, an example of a manufacturing method of the reactor 1 described above is described.

The reactor 1 can be, for example, manufactured by a manufacturing method including the following first to third steps.

In the first step, the assembly 10 and the case 5 are prepared.

In the second step, the assembly 10 is accommodated into the case 5.

In the third step, the sealing resin portion 6 is formed in the case 5.

(First Step)

In the first step, the assembly 10 including the holding member 41 provided with the aforementioned projections 4*p* and the case 5 are prepared. In this example, the assembly 10 is fabricated by assembling the coil 2, the magnetic core 3 and the holding members 4. Further, in this example, the molded resin portions 8 (FIG. 1) are formed. Specifically, the molded resin portions 8 are formed to cover the outer peripheral surfaces of the outer core portions 33 with the coil 2 and the magnetic core 3 held at predetermined positions by the holding members 41, 42. At this time, part of the resin for constituting the molded resin portions 8 is filled between the winding portions 21, 22 and the inner core portions 31, 32 through the clearances between the outer core portions 33 and the recesses 44 and the clearances between the inner core portions 31, 32 and the through holes 43. Thus, the molded resin portions 8 are formed to be interposed between the winding portions 21, 22 and the inner core portions 31, 32. Further, the coil 2, the magnetic core 3 and the holding members 4 are integrated by the molded resin portions 8.

The prepared case 5 is, for example, made of nonmagnetic metal. In this example, the case 5 is a die-cast product made of aluminum.

(Second Step)

In the second step, the assembly 10 is accommodated into the case 5 through the opening 55 of the case 5. The assembly 10 is so accommodated into the case 5 that the arrangement mode of the assembly 10 is the upright type described above. In this example, a state where the assembly 10 is accommodated in the case 5 is stably maintained by the contact of the leg portions 49 with the inner bottom surface 510 of the case 5. Further, in this example, a state where the predetermined interval is provided between the outer peripheral surface 100 of the assembly 10 and the inner peripheral surface 520 of the case 5 can be ensured by the projections 47, 48 of the holding member 41.

(Third Step)

In the third step, the resin is filled into the case 5 to form the sealing resin portion 6 (FIG. 1). Specifically, the resin, which will become the sealing resin portion 6, is filled with the assembly 10 accommodated in the case 5. In this example, the resin, which will become the sealing resin portion 6, is a silicone resin, more specifically, a silicone gel.

The resin is preferably filled by placing the case 5 accommodating the assembly 10 in a vacuum tank and injecting the resin in a vacuum state. The inclusion of air bubbles in the sealing resin portion 6 can be suppressed by injecting the resin in the vacuum state.

By solidifying the resin after the resin is filled into the case 5, the sealing resin portion 6 (FIG. 1) is formed. The resin may be solidified under appropriate conditions according to the used resin.

(Use Application)

The reactor 1 can be used as a component of a circuit for performing a voltage stepping-up operation and a voltage stepping-down operation. The reactor 1 can be used, for example, as a constituent component of various converters and power conversion devices. Examples of converters include in-vehicle converters to be installed in vehicles, typically DC-DC converters and converters of air conditioners. Example of the vehicles include hybrid vehicles, plug-in hybrid electric vehicles, electric vehicles and fuel cell vehicles.

(Main Effects)

Since the holding member 41 arranged on the side of the opening 55 of the case 5 includes the projections 4*p* in the reactor 1 of the first embodiment, an amplitude when the assembly 10 vibrates in the direction intersecting the depth direction of the case 5 can be reduced. One of reasons for this is that the interval between the outer peripheral surface 100 of the assembly 10 and the inner peripheral surface 520 of the case 5 is locally narrowed on the side of the opening 55 of the case 5 by the projections 4*p*. As a result, a displacement amount of the assembly 10 in the above intersecting direction, i.e. the amplitude, tends to be reduced. Another reason is that the contact area is about the size of the projections 4*p* when the outer peripheral surface 100 of the assembly 10 and the inner peripheral surface 520 of the case 5 contact each other. Thus, the contact area of the outer peripheral surface 100 of the assembly 10 and the inner peripheral surface 520 of the case 5 is small as compared to the case where the projections 4*p* are not provided. As a result, vibration is less likely to be transmitted between the assembly 10 and the case 5.

In the reactor 1 of this example, the interval between the outer peripheral surface 100 of the assembly 10 and the inner peripheral surface 520 of the case 5 is relatively larger on the side of the opening 55 of the case 5 than on the side of the bottom plate portion 51 of the case 5 since the inner peripheral surface 520 of the case 5 is inclined. Further, in the reactor 1 of this example, an amplitude on the side of the opening 55 in the assembly 10 tends to increase since the ratio of the height to the width in the assembly 10 exceeds 1.0. Even in such a reactor 1, the amplitude in the aforementioned intersecting direction can be reduced by the projections 4*p*.

Further, in the reactor 1 of this example, the amplitude in the intersecting direction can be reduced for the following reasons (1) to (4).

(1) The holding member 41 includes the plurality of projections 4*p*. Particularly, the projections 47, 48 are provided on the respective first surfaces 441, 442 and second surfaces 431, 432. Further, the projections 47, 48 are provided at even positions of the respective surfaces 441, 442, 431 and 432. Thus, as compared to the case where only one projection 4*p* is provided, an amplitude can be reliably reduced even if the assembly 10 vibrates in an arbitrary intersecting direction in the case 5.

(2) The projections 4*p* have the spherical segment shape. The projections 4*p* come into point contact with the inner peripheral surface 520 of the case 5 and the contact area is small Thus, vibration is less likely to be transmitted between the assembly 10 and the case 5.

(3) If the reactor 1 is in the stationary state without vibration, the projections 4*p* are not in contact with the inner peripheral surface 520 of the case 5. Thus, even if the reactor 1 vibrates, the projections 4*p* and the case 5 are less likely to contact each other. As a result, vibration is less likely to be transmitted or preferably not transmitted at all between the assembly 10 and the case 5. As a result, the assembly 10 and the case 5 are less likely to vibrate as an integrated body.

(4) Since the leg portions 49 are provided, the contact area of the end surface 105 of the assembly 10 and the inner bottom surface 510 of the case 5 is about the size of the leg portions 49. That is, the contact area of the assembly 10 and the inner bottom surface 510 of the case 5 is small as compared to the case where the leg portions 49 are not provided. As a result, vibration is less likely to be transmitted between the assembly 10 and the case 5.

The reactor 1 of the first embodiment can prevent the shear of the sealing resin portion 6 due to the vibration of the assembly 10 since being able to reduce the amplitude of the assembly 10 as described above. Thus, in the reactor 1, a state where the sealing resin portion 6 fixes the assembly 10 in the case 5 can be maintained over a long period of time. Further, the sealing resin portion 6 satisfactorily functions as a heat dissipation path of the assembly 10 over a long period time. Such a reactor 1 can improve the reliability of a fixing structure for the assembly 10 and is excellent in heat dissipation. Further, the reactor 1 can also suppress noise due to the vibration of the assembly 10.

The reactor 1 of the first embodiment achieves the following effects (i) to (iv).

(i) Miniaturization is possible for the following reasons.

(1) Since the arrangement mode of the assembly 10 is the upright type, the installation area of the assembly 10 with respect to the bottom plate portion 51 of the case 5 can be reduced as compared to the aforementioned horizontally placed type.

(2) Since the arrangement mode of the assembly 10 is the upright type, a large facing area of the winding portions 21, 22 and the side wall portion 52 can be secured as compared to the aforementioned horizontally placed type. Further, the intervals between the winding portions 21, 22 and the side wall portion 52 can be made uniformly smaller. The reactor 1 is thin since the interval between the assembly 10 and the case 5 is small.

(3) Resin introduction paths described in Patent Document 2 need not be provided on four corners of the case 5. Thus, the case 5 tends to be small.

(ii) The reactor 1 is excellent in heat dissipation for the reason (2) of the effect (i) and the following reasons.

(1) The intervals between the both winding portions 21, 22 and the inner peripheral surface 520 of the case 5 are suitably maintained by the projections 4*p*. Thus, the sealing resin portion 6 is suitably present between the winding portions 21, 22 and the inner peripheral surface 520 of the case 5.

(2) Since the projections 4*p* have the spherical segment shape, the sealing resin portion 6 is less likely to be sheared by the projections 4*p*. That is, the cutting of a heat transmission path by the sealing resin portion 6 is suppressed.

(iii) The reactor 1 is excellent in electrical insulation between the assembly 10, particularly the winding portions 21, 22, and the case 5 for the reason (1) of the effect (ii) and the following reasons.

(1) The contact of the both winding portions 21, 22 and the inner peripheral surface 520 of the case 5 can be prevented by the contact of the projections 4*p* with the inner peripheral surface 520 of the case 5.

(2) The clearance is provided between the end surface 105 of the assembly 10 and the inner bottom surface 510 of the case 5 by the leg portions 49.

(iv) The reactor 1 is excellent in manufacturability since the resin, which will become the sealing resin portion 6, is easily filled for the following reasons. Further, the sealing resin portion 6 hardly includes air bubbles. Furthermore, there is hardly any part where the sealing resin portion 6 is not filled.

(1) The intervals between the both winding portions 21, 22 and the inner peripheral surface 520 are suitably maintained. Thus, the resin, which will become the sealing resin portion 6, easily flows between the winding portions 21, 22 and the inner peripheral surface 520 of the case 5.

(2) The assembly 10 accommodated in the case 5 is stably supported on the inner bottom surface 510 of the case 5 by the leg portions 49. Thus, the formation of an excessively narrow clearance due to the tilt of the assembly 10 in the case 5 is prevented when the sealing resin portion 6 is filled.

Second Embodiment

A reactor 1A according to a second embodiment is described with reference to FIGS. 5A to 8B.

Figure 5B:
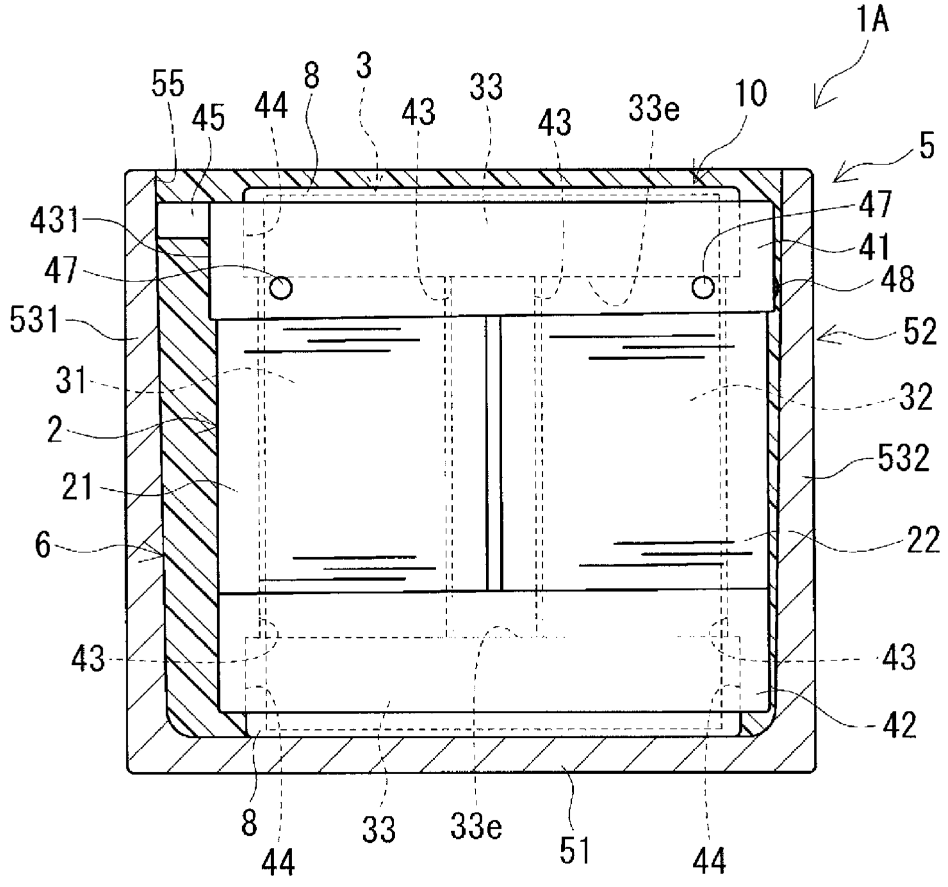
FIG. 5B is a schematic partial side view in section of the reactor according to the second embodiment.

A basic configuration of the reactor 1A is similar to that of the reactor 1 of the first embodiment. To sum up, the reactor 1A includes a coil 2, a magnetic core 3, holding members 41, 42 and a case 5 as shown in FIG. 5B. The holding members 41, 42 are arranged to face end surfaces of both winding portions 21, 22. An arrangement mode of an assembly 10 is an upright type. The holding member 41 to be arranged on the side of an opening 55 of the case 5 includes projections 47, 48 (see also FIGS. 5A and 6).

Particularly, in the reactor 1A of the second embodiment, one holding member 41 located on the side of the opening 55 of the case 5 includes a protruding portion 45. As shown in FIG. 5A, clearances 46 are provided between at least one of long side parts 541, 542 in a side wall portion 52 and the protruding portion 45 when the case 5 is viewed from above. The protruding portion 45 contributes to the formation of the clearances 46, in which a nozzle 65 to be described later (FIG. 8B) can be arranged, while having functions similar to those of the projection 48.

The protruding portion 45 and the clearances 46 are described in detail below and detail description is not given for the same configuration and effects as in the first embodiment.

A sealing resin portion 6 is not shown in FIG. 5A.

Figure 5C:
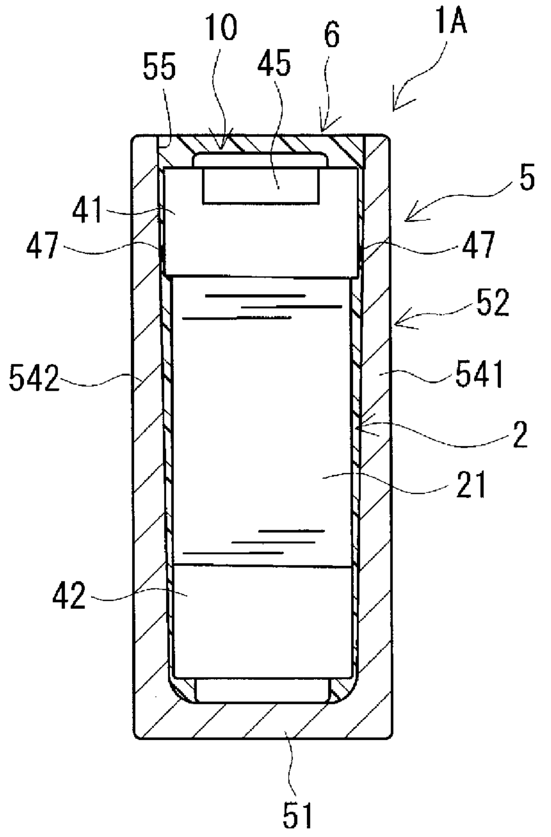
FIG. 5C is a schematic partial front view in section of the reactor according to the second embodiment.
Figure 6:
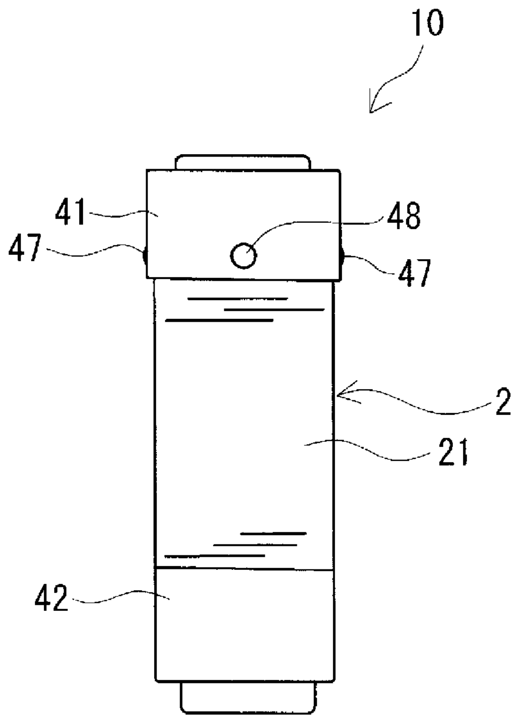
FIG. 6 is a schematic back view of an assembly provided in the reactor according to the second embodiment.
Figure 7:
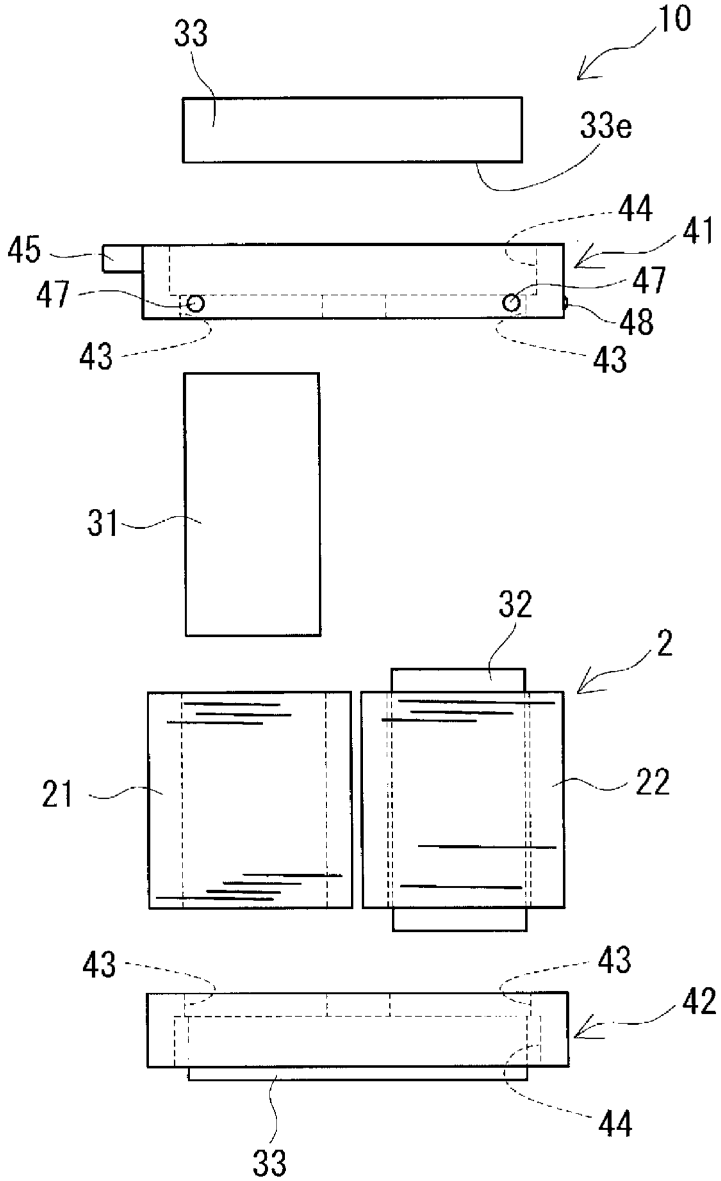
FIG. 7 is a schematic exploded side view showing a manufacturing process of the assembly provided in the reactor according to the second embodiment.

FIGS. 5B and 5C show the case 5 and the sealing resin portion 6 in section to make an internal structure of the reactor 1A easily understandable.

FIG. 5B is a partial section along B-B in FIG. 5A. FIG. 5B shows the appearance of the assembly 10 in the case 5 viewed from the side of a side surface and shows cross-sections of the case 5 and the sealing resin portion 6 cut by a plane parallel to the side surface.

FIG. 5C is a partial section along C-C in FIG. 5A. FIG. 5C shows the appearance of the assembly 10 in the case 5 viewed from the side of a front surface and shows cross-sections of the case 5 and the sealing resin portion 6 cut by a plane parallel to the front surface.

(Protruding Portion)

Out of the holding members 41, 42, the one holding member 41 located on the side of the opening 55 of the case 5 includes the protruding portion 45 projecting toward a short side part 531 as shown in FIGS. 5A and 5B. The holding member 41 of this example includes the projection 48 projecting toward a short side part 532 (see also FIGS. 6 and 7), but includes no projection 48 projecting toward the short side part 531 (see also FIGS. 5C and 7).

The protruding portion 45 is provided to project from a part of a second surface 431 of the holding member 41 facing the short side part 531. The protruding portion 45 is so arranged that the tip thereof is proximate to the inner surface of the short side part 531 when the reactor 1A is in a stationary state without vibration. Such a protruding portion 45 restricts the position of the assembly 10 in a length direction, i.e. in a lateral direction of FIGS. 5A and 5B, with respect to the case 5.

Further, as shown in FIG. 5A, the predetermined clearances 46 are formed between the protruding portion 45 and at least one of the long side parts 541, 542, more specifically end parts of the long side parts 541, 542 on the side of the short side part 531.

The position(s) and number of the protruding portion(s) are not particularly limited.

The position of the protruding portion 45 may be in a center in a width direction of the holding member 41, i.e. a vertical direction of FIG. 5A or may deviate from the center.

At least one protruding portion 45 is sufficient and a plurality of protruding portions 45 may be provided.

In this example, one protruding portion 45 is provided in a widthwise center of the holding member 41.

The shape of the protruding portion 45 is not particularly limited.

In this example, the protruding portion 45 has a rectangular shape in a plan view (see FIG. 5A). The shape of the protruding portion 45 is not limited to a rectangular shape, but may be a polygonal shape, a semicircular shape, a semielliptical shape or another shape in the plan view. Examples of the polygonal shape include a triangular shape and a trapezoidal shape.

The size of the protruding portion 45 is set to form the clearances 46 of a predetermined size.

For example, a projection length of the protruding portion 45 is 5 mm or more and 15 mm or less and, further, 6 mm or more and 12 mm or less. The longer the projection length of the protruding portion 45, the longer the long side parts 541, 542. Thus, the case 5 is enlarged. In this example, the projection length is so adjusted that the tip of the protruding portion 45 is not in contact with the inner surface of the short side part 531 in the stationary state as described above.

Further, a width of the protruding portion 45 is smaller than that of the holding member 41. The width of the protruding portion 45 is, for example, so set that an interval between at least one long side part 541, 542 and the outer peripheral surface of the protruding portion 45 is 5 mm or more and, further, 6 mm or more.

The protruding portion 45 has such a thickness as not to be easily deformed or broken. The thickness here is a dimension in the height direction, i.e. a dimension in the vertical direction of FIG. 5B. The thickness of the protruding portion 45 of this example is about slightly less than half the thickness of the holding member 41. The thickness of the protruding portion 45 may be equal to or larger than the thickness of the entire holding member 41. For example, the protruding portion 45 may be in the form of a rod extending from the holding member 41 toward the other holding member 42. The larger the thickness of the protruding portion 45, the less resin is used to form the sealing resin portion 6. Thus, manufacturing cost can be reduced, such as by shortening a filling time of the resin.

(Clearances)

As shown in FIG. 5A, the clearance 46 is formed between at least one long side part 541, 542 and the protruding portion 45 when the reactor 1A is viewed from above. In this example, the clearances 46 are provided between the both long side parts 541, 542 and the protruding portion 45. That is, the clearances 46 are provided on both sides of the protruding portion 45 on the side of the one short side part 531. In other words, the clearances 46 are provided in regions except the protruding portion 45, out of a region surrounded by the second surface 431 of the holding member 41 facing the one short side part 531, the inner surface of the short side part 531 and the respective inner surfaces of the long side parts 541, 542.

Figure 8A:
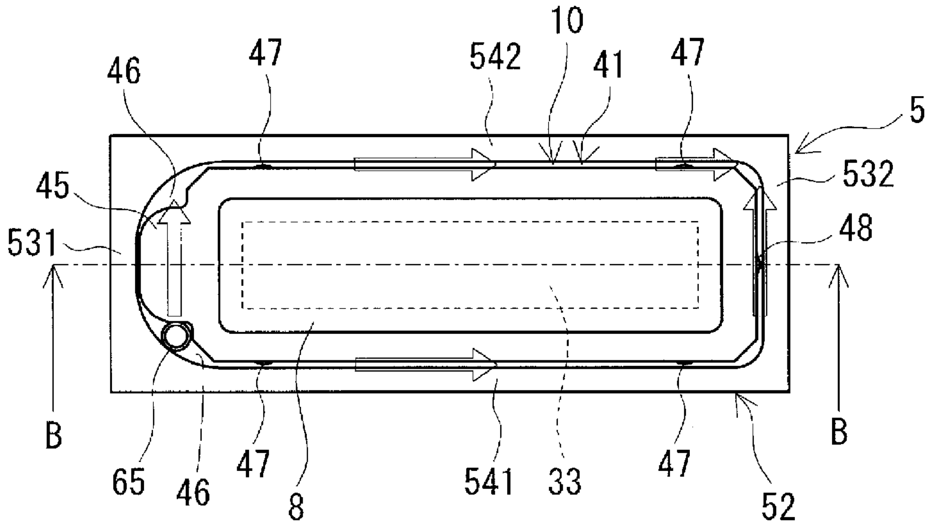
FIG. 8A is a schematic plan view of the assembly and a case showing a step of forming a sealing resin portion.
Figure 8B:
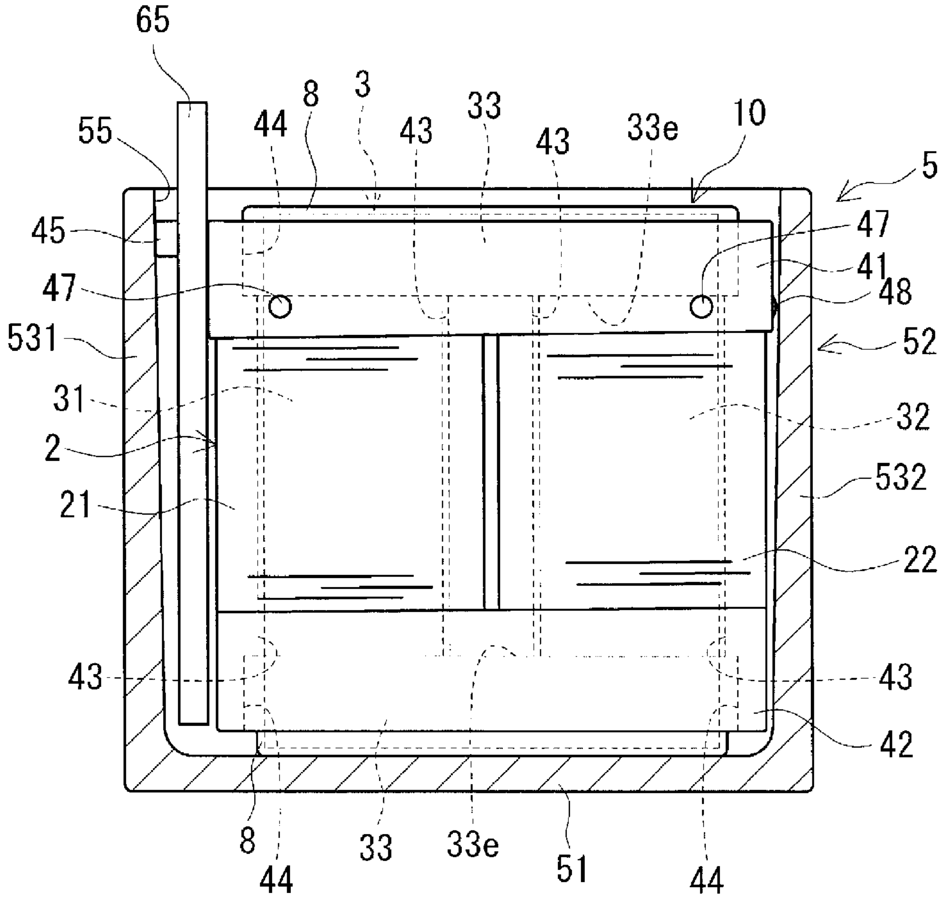
FIG. 8B is a schematic partial side view in section of the assembly and the case showing the step of forming the sealing resin portion.

In forming the sealing resin portion 6, the nozzle 65 for injecting the resin, which will become the sealing resin portion 6, is inserted into the clearance 46 (see FIGS. 8A and 8B). The size of the clearance 46 is not particularly limited as long as the nozzle 65 (FIG. 8A) is insertable thereinto when the reactor 1A is viewed from above. The size of the clearance 46 can be adjusted according to the size of the protruding portion 45. Thus, even if a diameter of the nozzle 65 is large, the clearance 46 into which the nozzle 65 can be inserted can be easily formed. That is, the clearance 46 corresponding to the diameter of the nozzle 65 can be easily formed. For example, the clearance 46 has, for example, a diameter of 4 mm or more and, further, 5 mm or more in a plan view. The clearance 46 is formed to be continuous from the side of the opening 55 to the side of the bottom plate portion 51 of the case 5.

(Case)

In this example, out of the side wall portion 52 of the case 5, the inner surfaces of parts of the long side parts 541, 542 and the short side part 532 facing the winding portions 21, 22 are substantially constituted by flat surfaces as shown in FIG. 5A. Further, a part of the inner surface of the short side part 531 facing the protruding portion 45 is substantially constituted by a flat surface. Parts of the inner surface of the short side part 531 connected from the short side part 531 to the both long side parts 541, 542 are constituted by curved surfaces. In the side wall portion 52 of this example, end parts of the long side parts 541, 542, here end parts on the side of the short side part 531, are formed by curved surfaces having a relatively large radius of curvature.

(State of Arrangement of Assembly)

In the case of this example, the holding member 41 includes the protruding portion 45 on the side of the one short side part 531. Thus, as shown in FIG. 5B, the assembly 10 is arranged closer to the other short side part 532 with respect to the case 5.

(Manufacturing Method)

Mainly with reference to FIGS. 8A and 8B, an example of a manufacturing method of the reactor 1A described above is described.

FIG. 8A shows an arrangement position of the nozzle 65 in a step of forming the sealing resin portion 6. FIG. 8B is a partial section along B-B in FIG. 8A. FIG. 8B shows the appearance of the assembly 10 in the case 5 viewed from the side of a side surface as in FIG. 5B described above and shows a cross-section of the case 5 cut by a plane parallel to the side surface.

The reactor 1A of the second embodiment can be manufactured by the manufacturing method including the first to third steps described in the first embodiment. The first and second steps are as described above. The third step is particularly described below, focusing on points of difference.

(Third Step)

As shown in FIGS. 8A and 8B, in the third step, the resin, which will become the sealing resin portion 6, is filled to form the sealing resin portion 6 with the assembly 10 accommodated in the case 5. In this example, the resin is filled using the nozzle 65 for injecting the resin.

As shown in FIG. 8A, the resin is filled by inserting the nozzle 65 into the clearance 46 formed between the long side part 541, 542 of the side wall portion 52 and the protruding portion 45 of the holding member 41. As shown in FIG. 8B, the resin in a fluid state is injected from the side of the bottom plate portion 51 through the nozzle 65. For example, a thermosetting resin may be mixed and stirred and injected into the case 5. FIG. 8A illustrates a case where the nozzle 65 is inserted into one clearance 46 on the side of the long side part 541. The diameter of the nozzle 65 is, for example, 3.5 mm or more and 5 mm or less.

The tip of the nozzle 65 preferably reaches the vicinity of the bottom plate portion 51 as described below. If the resin is caused to flow from the side of the opening 55 of the case 5, air bubbles tend to be included in the resin. As a result, air bubbles tend to remain in the sealing resin portion 6. Particularly, air bubbles tend to remain in the sealing resin portion 6 on the side of the bottom plate portion 51. If the nozzle 65 is inserted into the clearance 46 and the resin is injected from the side of the bottom plate portion 51 to the side of the opening 55, air bubbles are hardly included in the resin. As a result, air bubbles hardly remain in the sealing resin portion 6. Particularly, it can be avoided that air bubbles remain in the sealing resin portion 6 on the side of the bottom plate portion 51. Thus, the sealing resin portion 6 can be satisfactorily filled into the case 5. Note that the tip of the nozzle 65 may not reach the vicinity of the bottom plate portion 51.

In the case of this example, the protruding portion 45 and the projections 47, 48 of the holding member 41 are respectively arranged in proximity to the short side parts 531, 532 and the long side parts 541, 542 of the side wall portion 52. Displacement amounts of the assembly 10 with respect to the case 5 in the length direction and width direction are limited by the protruding portion 45 and the projections 47, 48. Thus, a position shift of the assembly 10 can be effectively reduced when the resin, which will become the sealing resin portion 6, is filled into the case 5.

If the nozzle 65 is inserted into the clearance 46 provided on the side of the one short side part 531 and the resin is injected as shown in FIG. 8A, the resin is injected from the side of the short side part 531 and flows toward the other short side part 532. As shown by white arrows in FIG. 8A, the resin injected from the nozzle 65 flows between the assembly 10 and the long side parts 541, 542 from the side of the one short side part 531 and merges on the side of the other short side part 532. Thus, a merging point of the resin is created at a location distant from a location where the resin was injected. In this case, air bubbles mixed into the resin float up while the resin is flowing from the side of the one short side part 531 toward the side of the other short side part 532. Accordingly, the air bubbles in the resin are easily removed. Thus, the remaining of the air bubbles in the sealing resin portion 6 can be reduced by injecting the resin from the side of the one short side part 531. Further, if the resin is injected from the side of the one short side part 531, the merging point of the resin is one location on the side of the other short side part 532. Since the entrainment of air bubbles easily occurs at the merging point of the resin, less merging points are preferable. Since the resin merges at one location by injecting the resin from the one short side part 531, the remaining of air bubbles is easily reduced.

Although FIG. 8A illustrates the case where the nozzle 65 is inserted into one clearance 46 on the side of the long side part 541 and the resin is injected, there is no limitation to this. A nozzle may be also inserted into the clearance 46 on the side of the long side part 542 and the resin may be injected from two nozzles. By solidifying the resin after the resin is filled into the case 5, the sealing resin portion 6 (FIG. 5B) is formed.

(Main Effects)

The reactor 1A of the second embodiment achieves the following effects in addition to the effects of the reactor 1 of the first embodiment by including the protruding portion 45.

(a) The interval between the outer peripheral surface 100 of the assembly 10 and the inner surface of the short side part 531 of the case 5 is locally narrowed by the protruding portion 45. Thus, similarly to the projection 48, the protruding portion 45 contributes to reducing an amplitude when the assembly 10 vibrates in the aforementioned intersecting direction.

(b) Productivity can be improved for the following reasons.

(1) The clearances 46 can be provided between the case 5 and the protruding portion 45. With the assembly 10 accommodated in the case 5, the nozzle 65 can be inserted into the clearance 46 and the resin, which will become the sealing resin portion 6, can be filled into the case 5 through the clearance 46. If the size of the protruding portion 45 is adjusted, the nozzle 65 having a large diameter can be utilized. If the diameter of the nozzle 65 is large, the above resin filling operation can be efficiently performed.

(2) Since the resin is injected from the side of the bottom plate portion 51 by inserting the nozzle 65 into the clearance 46, air bubbles easily float up. Since air bubbles are hardly mixed into the resin, the remaining of air bubbles is avoided. Thus, the sealing resin portion 6 can be satisfactorily formed.

(3) Since the resin for constituting the sealing resin portion 6 is injected from the side of the one short side part 531, there are fewer merging points of the resin. Also from this aspect, the remaining of air bubbles in the sealing resin portion 6 is reduced.

(4) A displacement of the assembly 10 with respect to the case 5 is limited by the protruding portion 45 and the projections 47, 48. Thus, the position of the assembly 10 is less likely to deviate when the resin, which will become the sealing resin portion 6, is filled into the case 5.

(5) In forming the sealing resin portion 6, the resin can be injected by inserting the nozzle 65 into the clearance 46. Thus, it is not necessary to provide a resin introduction path described in paragraph [0052] and FIG. 2 and the like of Patent Document 2 in the side wall portion 52 of the case 5. Accordingly, the case 5 needs not be specially processed. In this respect, the processing time and manufacturing cost of the case 5 can be reduced.

(c) Miniaturization is possible for the following reason.

The protruding portion 45 is provided only on the side of the one short side part 531, out of the outer peripheral surface of the holding member 41, and the clearances 46 are formed only on the side of the one short side part 531. Thus, the case 5 is easily reduced in size as compared to the case where the protruding portion 45 is also provided on the side of the other short side part 532 and the clearances 46 are provided on the sides of the both short side parts 531, 532.

The reactor 1A of the second embodiment is configured such that the resin, which will become the sealing resin portion 6, can be satisfactorily filled while miniaturization is realized.

Note that although the reactor 1A of the second embodiment includes no leg portion 49, leg portions 49 may be provided. Further, the protruding portion 45 may be so provided that the tip thereof is in contact with the inner surface of the short side part 531 in the aforementioned stationary state.

Third Embodiment

A reactor 1B according to a third embodiment is described with reference to FIGS. 9A to 10.

The reactor 1B of the third embodiment differs from the reactor 1A of the second embodiment in that a short side part 531 includes a mounting seat 56 for supporting a protruding portion 45 of a holding member 41 and the protruding portion 45 and the mounting seat 56 are fastened. The following description is centered on points of difference from the second embodiment and similar matters are not described.

Figure 9A:
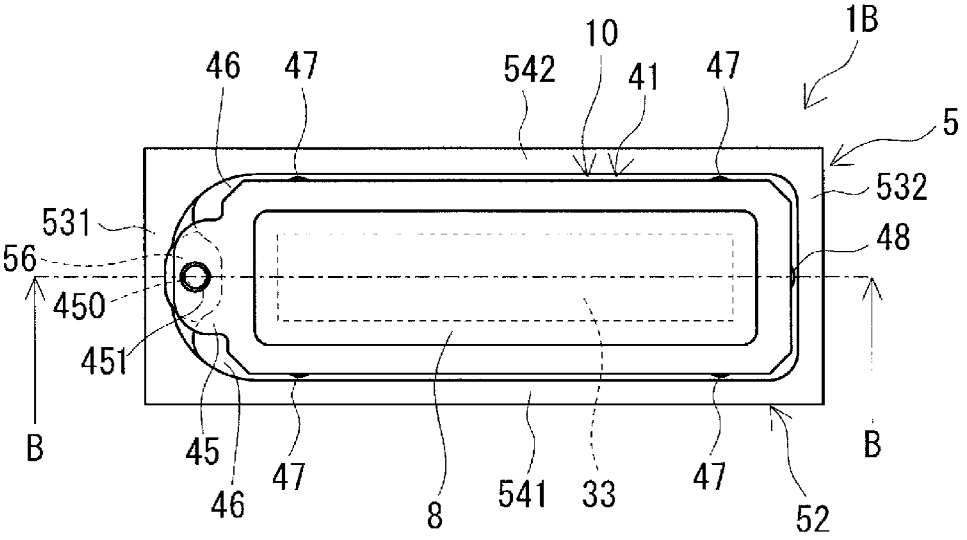
FIG. 9A is a schematic plan view of a reactor according to a third embodiment.
Figure 10:
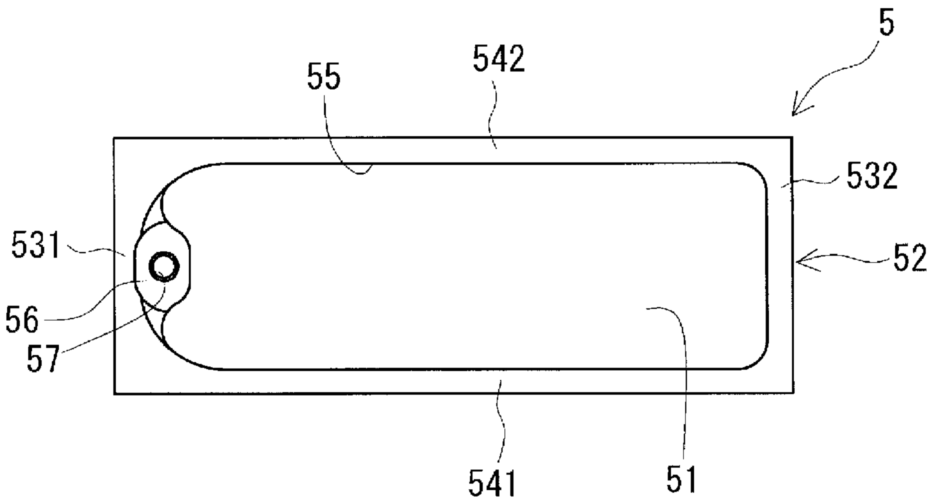
FIG. 10 is a schematic plan view of a case provided in the reactor according to the third embodiment.

A sealing resin portion 6 is not shown in FIG. 9A.

Figure 9B:
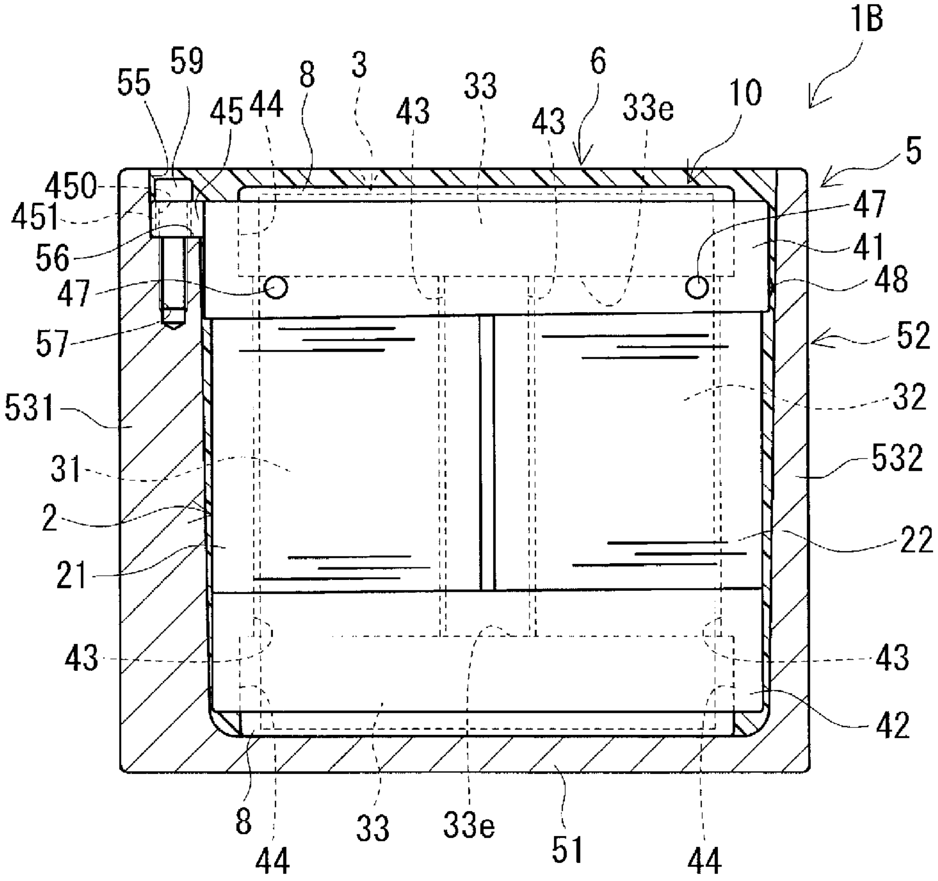
FIG. 9B is a schematic partial side view in section of the reactor according to the third embodiment.

FIG. 9B is a partial section along B-B in FIG. 9A. FIG. 9B shows the appearance of an assembly 10 in a case 5 viewed from the side of a side surface as in FIG. 5B described above and shows cross-sections of the case 5 and the sealing resin portion 6 cut by a plane parallel to the side surface.

(Mounting Seat)

As shown in FIG. 9B, the mounting seat 56 projects into the case 5 from the short side part 531 and supports a surface of the protruding portion 45 on the side of a bottom plate portion 51, i.e. a lower surface. As shown in FIG. 9A, the mounting seat 56 is provided to overlap the protruding portion 45 when the reactor 1B is viewed from above. In this example, the mounting seat 56 extends along the inner surface of the short side part 531 from the bottom plate portion 51.

As shown in FIGS. 9A and 9B, the protruding portion 45 includes a through hole 450 penetrating in a vertical direction. In this example, the through hole 450 is formed by embedding a collar 450 made of metal in the protruding portion 45. On the other hand, as shown in FIGS. 9B and 10, the mounting seat 56 includes a screw hole 57 in an upper surface side. The screw hole 57 is formed at a position overlapping the through hole 450 of the protruding portion 45 when the reactor 1B is viewed from above.

In this example, as shown in FIG. 9B, the protruding portion 45 and the mounting seat 56 are fastened by a bolt 59. The bolt 59 is inserted into the through hole 450 of the protruding portion 45 from the side of an opening 55 of the case 5 and screwed into the screw hole 57 of the mounting seat 56. The bolt 59 is not shown in FIG. 9A.

In the reactor 1B of the third embodiment, the assembly 10 can be firmly fixed to the case 5 by fastening the protruding portion 45 of the holding member 41 to the mounting seat 56. Thus, the detachment of the assembly 10 from the case 5, for example, due to an impact, vibration or the like can be avoided in the reactor 1B. Further, in this example, the mounting seat 56 is formed to extend along the inner surface of the short side part 531 from the bottom plate portion 51. Since the mounting seat 56 is present in the case 5 in the reactor 1B, a volume of the case 5 is smaller as compared to the reactor 1A (see FIG. 5B) of the second embodiment. Thus, a used amount of the resin, which will become the sealing resin portion 6, is reduced in the reactor 1B than in the reactor 1A. The manufacturing cost of the reactor 1B can be reduced by as much as the used amount of the resin, which will become the sealing resin portion 6, is reduced.

Test Example 1

Vibration characteristics of an assembly were evaluated for a reactor including a holding member provided with projections and a reactor including a holding member with no projection.

The reactors to be evaluated have the same configuration as the reactor 1 of the first embodiment except the presence or absence of the projections. That is, either reactor includes an assembly having a coil, a magnetic core and holding members, a case and a sealing resin portion (FIG. 1, etc.). The reactor of sample No. 1 includes a total of six projections on an outer wall portion of the holding member arranged on an opening side of the case. The reactor of sample No. 100 includes no projection on the holding member.

The vibration characteristics are evaluated by a CAE (Computer Aided Engineering) analysis using structural analysis software. MSC NASTRAN is used as the structural analysis software. Stresses applied to the reactor and the sealing resin portion when predetermined vibration is applied are analyzed by this structural analysis software. A vibration direction is a direction along short sides of the case. A vibration acceleration is 20 G.

As a result of the analysis, in the reactor of sample No. 100, a large stress is applied over the entire location of the sealing resin portion corresponding to long side parts of the case on the opening side of the case. That is, a planar stress is loaded to the sealing resin portion. From this, it can be said that an excessive shear load is easily applied to an interface between the inner peripheral surface of the case and the sealing resin portion in the reactor of sample No. 100. Thus, there is a concern for aggregate fracture and peeling from the case of the sealing resin portion. One of reasons why a large stress is applied in such a relatively wide range is thought to be that an amplitude in the vibration direction in the assembly is relatively large.

In contrast, in the reactor of sample No. 1, a somewhat large stress is applied to only the projections and the peripheries thereof in the sealing resin portion on the opening side of the case. That is, the stress is locally loaded to the sealing resin portion. From this, it can be said that an excessive shear load is less likely to be applied to an interface between the inner peripheral surface of the case and the sealing resin portion in the reactor of sample No. 1. One of reasons why a somewhat large stress is applied in a very small range is thought to be that an amplitude in the vibration direction in the assembly is smaller than in sample No. 100.

Note that the present invention is not limited to these illustrations and is intended to be represented by claims and include all changes in the scope of claims and in the meaning and scope of equivalents.

For example, at least one of the following changes can be made for the reactor 1 of the first embodiment and the like.

(Modification 1)

At least one of the ratio of the height to the length and the ratio of the height to the width in the assembly 10 is 1.0 or less.

(Modification 2)

The holding member 4 satisfies at least one of the following configurations (1) and (2).

(1) The outer wall portion 40 covers only a part of the outer peripheral surface of the outer core portion 33.

For example, the holding member 4 includes a plurality of wall pieces rising from the peripheral edge of the frame plate. The respective wall pieces are provided at predetermined intervals in a circumferential direction of the peripheral edge of the frame plate. At least one wall piece includes the projection(s) 4*p*. With this form, the contact area of the assembly 10 and the sealing resin portion 6 tends to increase.

(2) The outer wall portion 40 has a shape other than the rectangular shape in a plan view from the axial direction of the through holes 43 or in a plan view from the depth direction of the case 5.

As a specific example, the outer peripheral surface of the outer wall portion 40 may have a shape including curved surface(s) such as an elliptical shape or race track shape.

(Modification 3)

The magnetic core 3 satisfies at least one of the following configurations (1) to (3).

(1) The number of the core pieces constituting the magnetic core 3 is one, two, three, five or more.

(2) The magnetic core 3 includes a core piece having part(s) to be arranged in the winding portions of the coil 2 and part(s) to be arranged outside the winding portions. Examples of such a core piece include a U-shaped core piece and an L-shaped core piece.

(3) The outer peripheral shapes of the inner core portions 31, 32 are not analogous to the inner peripheral shapes of the winding portions 21, 22. For example, the winding portion 21 may have a rectangular tube shape and the inner core portion 31 may have a cylindrical shape.

(Modification 4)

The reactor 1 includes an unillustrated adhesive layer between the end surface 105 of the assembly 10 and the inner bottom surface 510 of the bottom plate portion 51.

The assembly 10 is firmly fixed to the case 5 by the adhesive layer. Thus, the heat of the assembly 10 is easily transferred to the bottom plate portion 51 of the case 5. Further, if the adhesive layer is made of electrically insulating resin, electrical insulation between the assembly 10 and the bottom plate portion 51 is enhanced. Examples of the electrically insulating resin for constituting the adhesive layer include thermosetting resins and thermoplastic resins. Examples of thermosetting resins include an epoxy resin, a silicone resin and an unsaturated polyester resin. Examples of thermoplastic resins include a PPS resin and an LCP. The constituent material of the adhesive layer may contain the aforementioned filler in addition to the above resin. The adhesive layer may be formed, utilizing a commercially available adhesive sheet or commercially available adhesive.

LIST OF REFERENCE NUMERALS

- 1, 1A, 1B reactor
- 10 assembly
  - 100 outer peripheral surface
  - 105 end surface
- 2 coil
  - 21, 22 winding portion
- 3 magnetic core
  - 31, 32 inner core portion
  - 33 outer core portion
  - 33*e* inner end surface
- 4, 41, 42 holding member
  - 40 outer wall portion
  - 43 through hole
  - 44 recess
  - 45 protruding portion
  - 46 clearance
  - 4*p*, 47, 48 projection
  - 49 leg portion
  - 441, 442 first surface
  - 431, 432 second surface
  - 450 through hole
  - 451 collar
- 5 case
  - 51 bottom portion
  - 52 side wall portion
  - 510 inner bottom surface
  - 520 inner peripheral surface
  - 531, 532 short side part
  - 541, 542 long side part
  - 55 opening
  - 56 mounting seat
  - 57 screw hole
  - 59 bolt
- 6 sealing resin portion
  - 65 nozzle
- 8 molded resin portion

What is claimed is:

1. A reactor, comprising:

a coil including a pair of winding portions arranged in parallel;

a magnetic core to be arranged inside and outside the winding portions;

a holding member for specifying mutual positions of the coil and the magnetic core;

a case for accommodating an assembly including the coil, the magnetic core and the holding member; and a sealing resin portion to be filled into the case, wherein:

the case includes a bottom plate portion, the assembly being placed on the bottom plate portion, a side wall portion for surrounding the assembly, and an opening facing the bottom plate portion, the assembly is so accommodated into the case that an axial direction of each winding portion is along a depth direction of the case, the magnetic core includes an outer core portion to be arranged outside the winding portions and on an opening side facing the bottom plate portion, the holding member includes an outer wall portion for covering at least a part of an outer peripheral surface of the outer core portion and at least one projection projecting from the outer wall portion toward an inner peripheral surface of the side wall portion such that an interval between the outer peripheral surface of the outer core portion and the inner peripheral surface of the side wall portion is locally narrowed on the opening side by the projection and a displacement amount of the assembly at the opening side in an arbitrary intersecting direction is limited due to the narrow interval, wherein the intersecting direction is a direction intersecting the depth direction and the axial direction, and the projection is embedded in the sealing resin portion.

2. The reactor of claim 1, wherein the inner peripheral surface is inclined to widen from the bottom plate portion side toward the opening side.

3. The reactor of claim 1, wherein, if a first rectangle enclosing the assembly is virtually defined in a plan view from the depth direction, a dimension of the first rectangle along a long side direction is a long side length, a dimension of the first rectangle along a short side direction is a short side length and a dimension of the assembly along the depth direction is a height of the assembly, at least one of a ratio of the height to the long side length and a ratio of the height to the short side length exceeds 1.0.

4. The reactor of claim 1, wherein if a second rectangle enclosing the outer wall portion is virtually defined in a plan view from the depth direction, the outer wall portion has a first surface along a long side direction of the second rectangle and a second surface along a short side direction of the second rectangle, and the holding member includes a first projection provided on the first surface and a second projection provided on the second surface.

5. The reactor of claim 1, wherein at least one of the projections has a spherical segment shape.

6. The reactor of claim 1, wherein:

the holding member includes a plurality of the projections, and at least one of the projections is not in contact with the inner peripheral surface.

7. The reactor of claim 1, wherein:

the assembly has an end surface facing the bottom plate portion and a leg portion, and the leg portion projects from the end surface toward the bottom plate portion.

* * * * *